United States Patent [19]

Bowdry, III et al.

[11] 4,042,124
[45] Aug. 16, 1977

[54] PAN UNSTACKING AND STACKING SYSTEM

[75] Inventors: William Perrin Bowdry, III, Dallas, Tex.; Irwin Edward Wickam, Wayzata, Minn.

[73] Assignee: Stewart Engineering & Equipment Co., Richardson, Tex.

[21] Appl. No.: 583,838

[22] Filed: June 2, 1975

[51] Int. Cl.$^2$ .................................................. B65G 57/04
[52] U.S. Cl. ................................. 214/6 DS; 198/627; 198/859; 214/6 H; 214/6 TS; 214/8.5 D
[58] Field of Search ................ 214/6 DS, 6 TS, 6 H, 214/8.5 A, 8.5 D; 187/3, 8.59, 8.67, 20, 22, 26; 198/163, 203, 859 X, 626, 627 X

[56] References Cited

U.S. PATENT DOCUMENTS

| | | | |
|---|---|---|---|
| 3,047,095 | 7/1962 | Bell et al. ................................... | 187/3 |
| 3,101,851 | 8/1963 | Heide et al. ........................... | 214/6 H |
| 3,533,517 | 10/1970 | Heide ................................. | 198/163 X |
| 3,770,143 | 11/1973 | Breitbach ........................... | 214/6 DS |
| 3,905,595 | 9/1975 | Adams et al. .................... | 214/6 H X |
| 3,933,254 | 1/1976 | Pulver et al. ..................... | 214/6 DS |
| 3,937,335 | 2/1976 | Lanham et al. .................... | 214/6 DS |

*Primary Examiner*—L. J. Paperner
*Attorney, Agent, or Firm*—Richards, Harris & Medlock

[57] ABSTRACT

In a pan unstacking and stacking system, stacks of pans are vertically positioned by pairs of spaced, parallel lift chains and pan engaging members mounted thereon. The lift chains are driven by drive shafts and drive sprockets which engage the upper and lower courses of a drive chain, respectively, thereby permitting adjustment of the spacing between the pan engaging members to accommodate pans of various sizes. The drive chain is in turn driven by a fluid powered cylinder operating through a clutch and brake apparatus to control the vertical positioning of the pan engaging members and pan stacks mounted thereon. Pans are transferred laterally relative to pan stacks supported on the pan engaging members by means of magnets positioned along a line in a horizontal plane situated above a stack and V-belts mounted for rotation around parallel courses situated on opposite sides of the line of magnets and including horizontal portions extending coincident therewith. To effect unstacking, magnets are lowered to engage the uppermost pan from a stack and then are raised to engage the pan with the belts, whereby the pan is transferred laterally. To effect stacking, the belts position a pan above the pan engaging members, after which the pan is pushed downwardly out of the field of the magnets and is dropped onto the stack.

64 Claims, 19 Drawing Figures

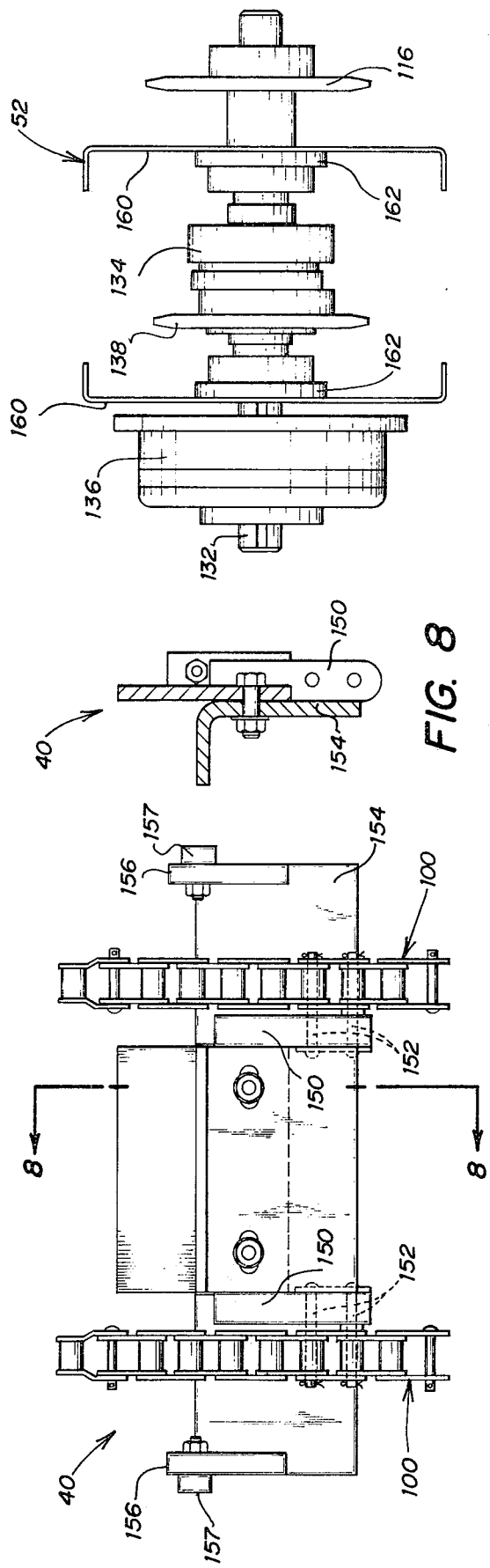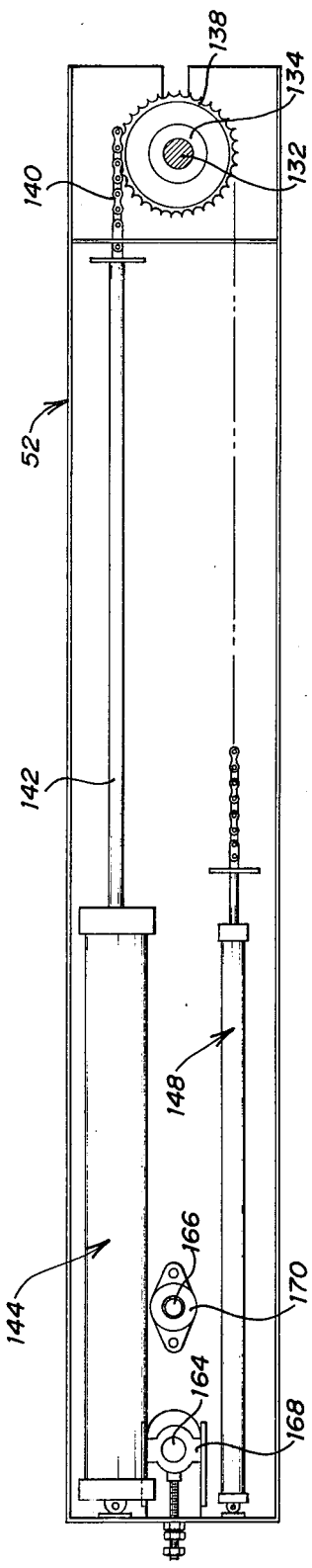

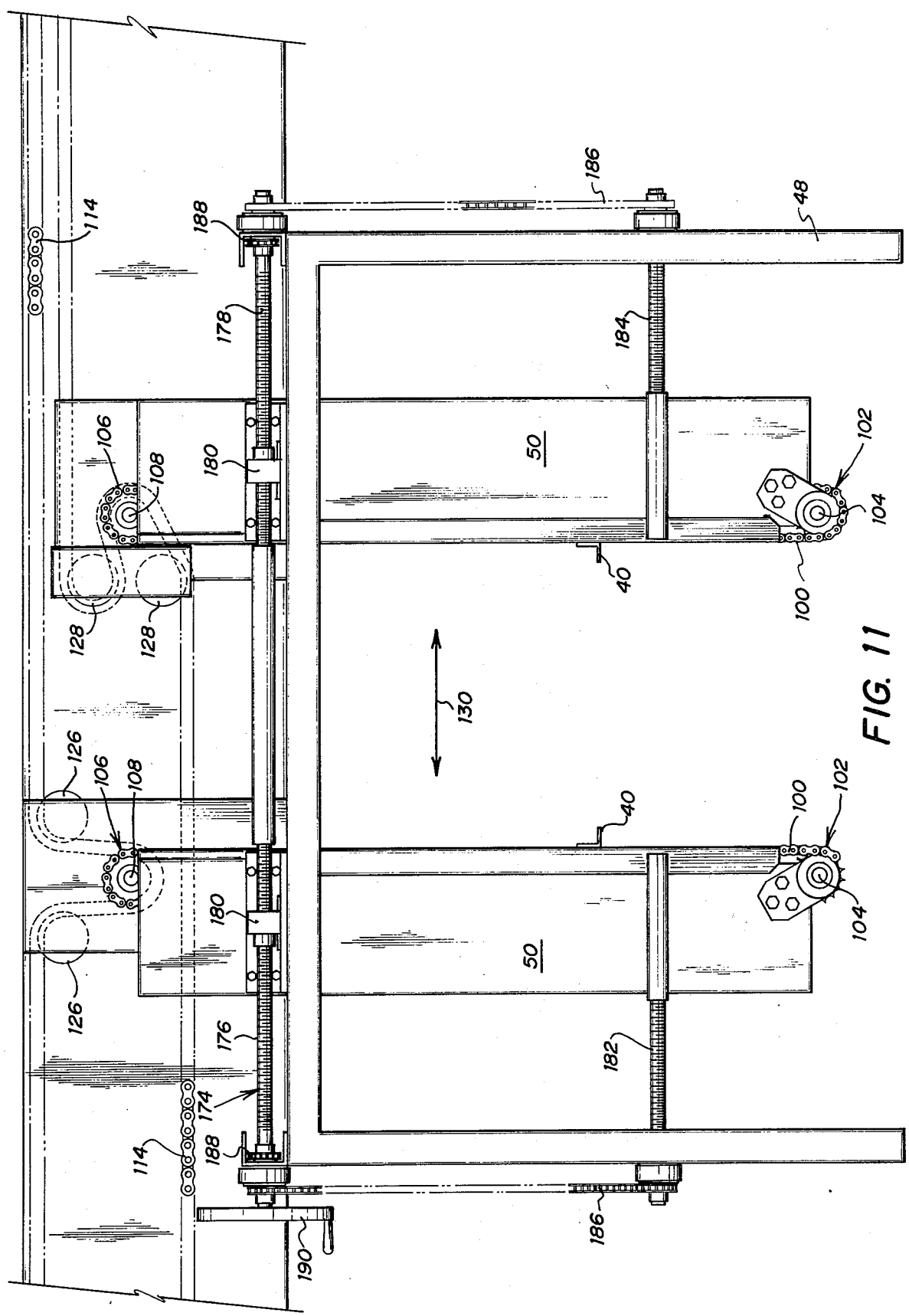

PAN UNSTACKING AND STACKING SYSTEM

BACKGROUND AND SUMMARY OF THE INVENTION

This invention relates to a pan unstacking and stacking system, and more particularly to a pan handling system intended primarily for use in conjunction with bread pans and other pans of the type commonly employed in the baking industry.

In the operation of a modern automated bakery, it is frequently necessary to move a large number of a particular type of baking pan onto or off of the baking line. For example, a particular size and/or type of pan may be associated with a particular type of bread. Whenever it is desired to bake this type of bread, a quantity of baking pans sufficient to accommodate the contemplated baking run must be moved onto the baking line in order to receive the baking dough and transport the dough through the baking oven. Subsequently these pans must be removed from he baking line in order to make way for the baking pans required by the next baking operation.

While the function of moving baking pans onto and off of a baking line may obviously be performed manually, apparatus known as pan unstackers and stackers has heretofore been provided for performing this function. Thus, baking pans not required for a particular baking operation are typically accumulated in stacks and transferred to a storage area. Whenever the pans are required for a baking operation, the stacks are moved from the storage area to the pan unstacker which functions to transfer individual pans from the stack onto the baking line. Subsequently the pan stacker removes individual pans from the baking line and accumulates the pans in stacks which are later transferred to the storage area. It will be understood that in certain instances the pan unstacker and stacker apparatus may comprise the same machine which is simply operated in reverse directions.

Although various pan stacking and unstacking systems have been provided heretofore, a number of problems have generally remained unsolved in the industry. One such problem involves reliability of operation. Thus, since the unstacking and stacking system may comprise the only means available for moving pans onto and off of a baking line, a failure of the unstacking and stacking system can necessitate the shutdown of an entire automated baking facility. This can be extremely costly, not only from the standpoint of down time, but also from the standpoint of the potential loss of baking dough and other perishable materials.

Another problem which has heretofore not been completely solved in the design of pan unstacking and stacking systems for the baking industry involves the ability of such systems to handle pans of various sizes. Thus, in order to be commercially acceptable, such a system must be capable of unstacking and stacking all the various sizes of baking pans which are utilized in the associated baking system. Of equal importance is the requirement that the adjustments necessary to accommodate the system to different sizes of pans be carried out reliably and without difficulty so as to minimize the time required to effect conversion from one pan size to another.

The present invention comprises a baking pan unstacking and stacking system which fulfills the foregoing requirements while simultaneously eliminating difficulties that have long since characterized the prior art. In accordance with the broader aspects of the invention, opposed pairs of pan engaging members are mounted on opposed pairs of spaced, parallel lift chains and function to vertically position stacks of pans by engagement with the lowermost pan of the stack. The lift chains are driven by drive shafts having drive sprockets which engage the upper and lower chain courses of the drive chain. This permits varying the spaces between the pan engaging members to accommodate baking pans of various sizes without disturbing the vertical positioning of the pan engaging members relative to one another.

The drive chain is in turn driven by a pneumatic cylinder operating through a power input chain, a power input sprocket, a clutch and brake apparatus, a power input shaft and a drive sprocket mounted on the power input shaft and engaging the drive chain. The power input chain is connected at one end to the rod of the pneumatic cylinder and at the other end to a smaller pneumatic cylinder functioning to maintain a predetermined tension on the power input chain. The use of pneumatic cylinders to supply the power for vertically positioning the pan stacks is advantageous in that any jam or other system malfunction simply results in stalling the system rather than in a burnout, as is often the case when an electrical prime mover is used. Moreover, the system is economical in that no power is utilized except during the actual vertical movement of the pan stacks.

The pan unstacking and stacking system further comprises a pan transporting apparatus for effecting lateral pan movement. A plurality of magnets extend along a line positioned in a horizontal plane above the pan stacks. V-belt power transmission belts are mounted for rotation in vertical planes extending adjacent the line of magnets. Each belt rotates around a course including a portion extending coincident with the horizontal plane of the magnets. The belts therefore function to effect lateral movement of pans supported by the magnetic field of the magnets. In the unstacking portion of the system, certain of the magnets are initially moved downward, whereby the uppermost pan is removed from the stack by the magnetic field of the magnets. The magnets are then moved upwardly to engage the pan with the moving belts, whereby the pan is moved laterally. In the stacking portion of the system the belts position a pan above the stack, whereby the pan is moved downwardly out of the magnetic field and is dropped onto the top of the stack.

DESCRIPTION OF THE DRAWINGS

A more complete understanding of the invention may be had by reference to the following Detailed Description when taken in conjunction with the accompanying Drawings, wherein:

FIG. 7 is an illustration of the pan engaging members of the apparatus of FIG. 6;

FIG. 8 is a sectional view taken along the line 8—8 in FIG. 7 in the direction of the arrows;

FIG. 9 is an illustration of the power pneumatic cylinder and the tensioning pneumatic cylinder structure of the apparatus of FIG. 6;

FIG. 10 is an illustration of the clutch brake structure of the apparatus of FIG. 6;

FIG. 11 is a side view of a portion of the unstacking mechanism of FIG. 1;

DETAILED DESCRIPTION

Figure 1:
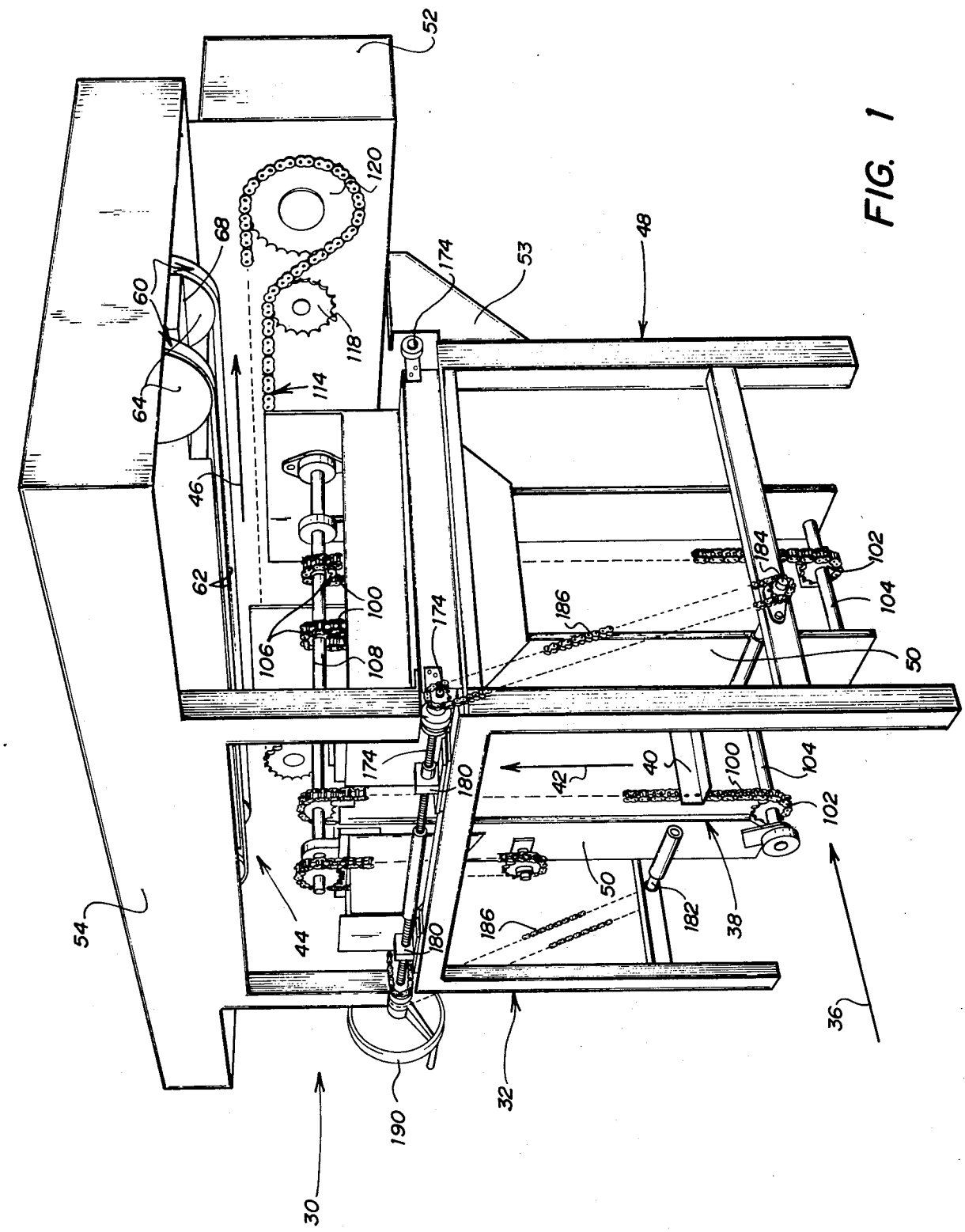
FIG. 1 is a perspective view of the pan unstacking mechanism of a pan unstacking and stacking system incorporating the invention.
Figure 2:
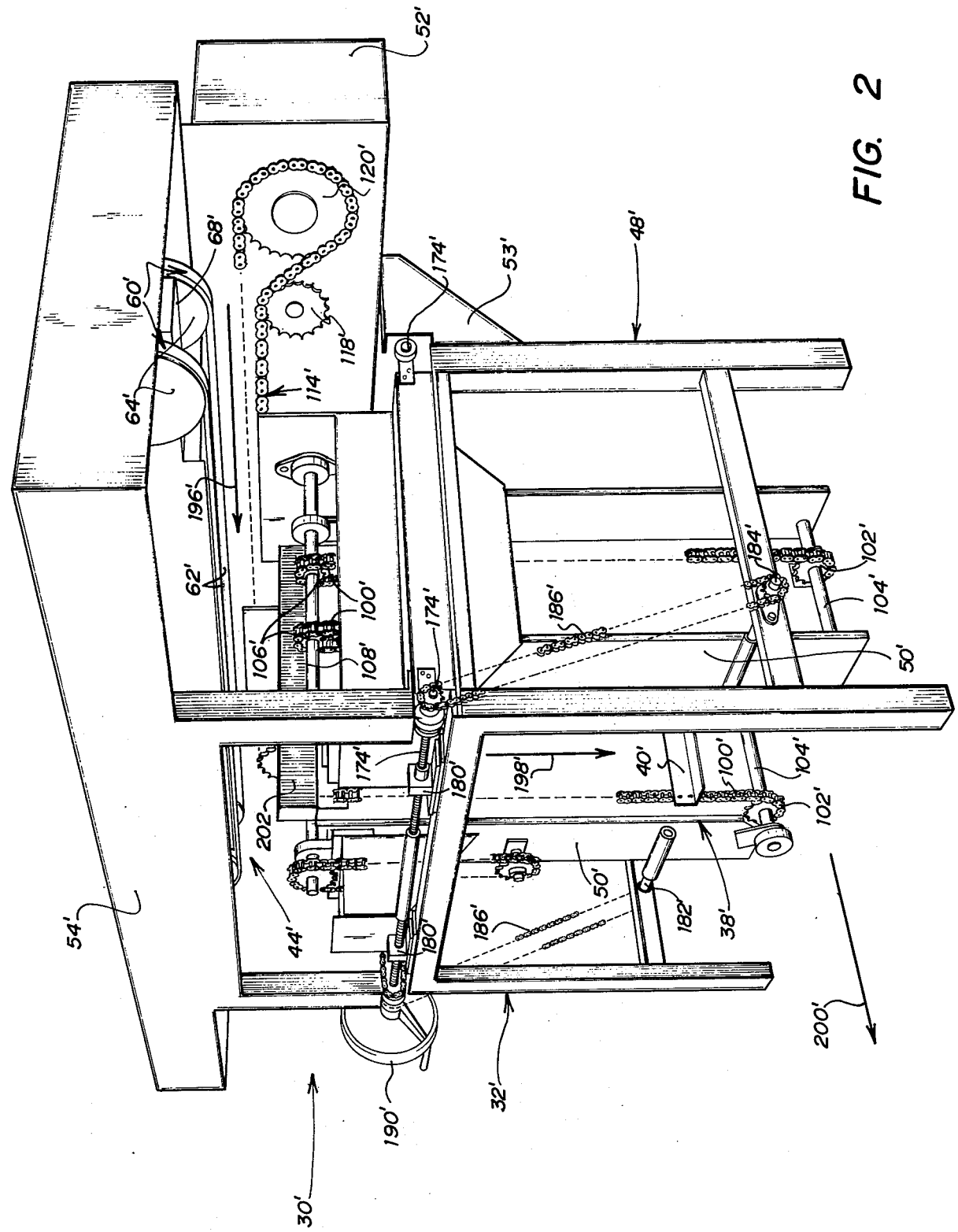
FIG. 2 is a perspective view of the pan stacking mechanism of the pan unstacking and stacking system.

Referring now to the Drawings, and particularly to FIGS. 1 and 2, there is shown a pan unstacking and stacking system 30 incorporating the invention. The pan unstacking and stacking system 30 includes a pan unstacking mechanism 32 which functions to receive baking pans and the like in the form of vertical sacks and to deliver individual pans from the such stacks to an associated pan conveyor mechanism. The pan unstacking and stacking system 30 further includes a pan stacking mechanism 34 which functions to receive individual pans from the associated pan conveyor mechanism and to accumulate the received pans in the form of vertical stacks.

The pan unstacking mechanism 32 receives vertically oriented pan stacks in the direction indiciated by the arrow 36. Preferably a conveyor is utilized to deliver pan stacks to the unstacking mechanism 32. Various types of conventional conveyors may be utilized for this purpose. Alternatively, pan stacks may be delivered to the unstacking mechanism 32 by means of a fork lift truck or similar device.

The unstacking mechanism 32 includes a stack positioning apparatus 38. The stack positioning apparatus 38 includes pan engaging members 40 which function to support a stack of pans by engagement with the lowermost pan of the stack. The positioning apparatus 38 normally functions to lift a stack of pans as indicated by the arrow 42. By this means the uppermost pan of the stack is positioned for engagement with a pan transporting apparatus 44.

The pan transporting apparatus 44 functions to remove individual pans from a stack of pans supported by the stack positioning apparatus 38. This is accomplished by lifting the uppermost pan from the stack and then transporting the pan laterally in the direction of the arrow 46. In this manner individual pans are removed from the stack and are delivered to an associated pan conveyor mechanism which extends to a point immediately adjacent to the pan transporting apparatus 44 of the unstacking mechanism 32.

The unstacking mechanism 32 functions to deliver to the associated pan conveyor mechanism the exact number of pans that may be required for a baking or other operation. When the required number of pans has been delivered to the pan conveyor mechansim, there may be a partial pan stack remaining in the stack positioning apparatus 38. The apparatus 38 is therefore capable of lowering the partial pan stack in the direction opposite to that of the arrow 42. The partial pan stack is then removed from the unstacking mechanism 32 by a conveyor or similar apparatus.

Considered structurally, the unstacking mechanism 32 includes a frame 48 which supports all of the operating components of the mechanism. The stack positioning apparatus 38 includes a pair of subframes 50 which are selectively positionable relative to the frame 48 to accommodate pans of various widths. The stack positioning apparatus 38 is driven by a mechanism that is housed within a subframe 52 which is supported on the frame 48 by means of brackets 53. The pan transporting apparatus 44 is housed within the uppermost portion 54 of the frame 48.

Figure 3:
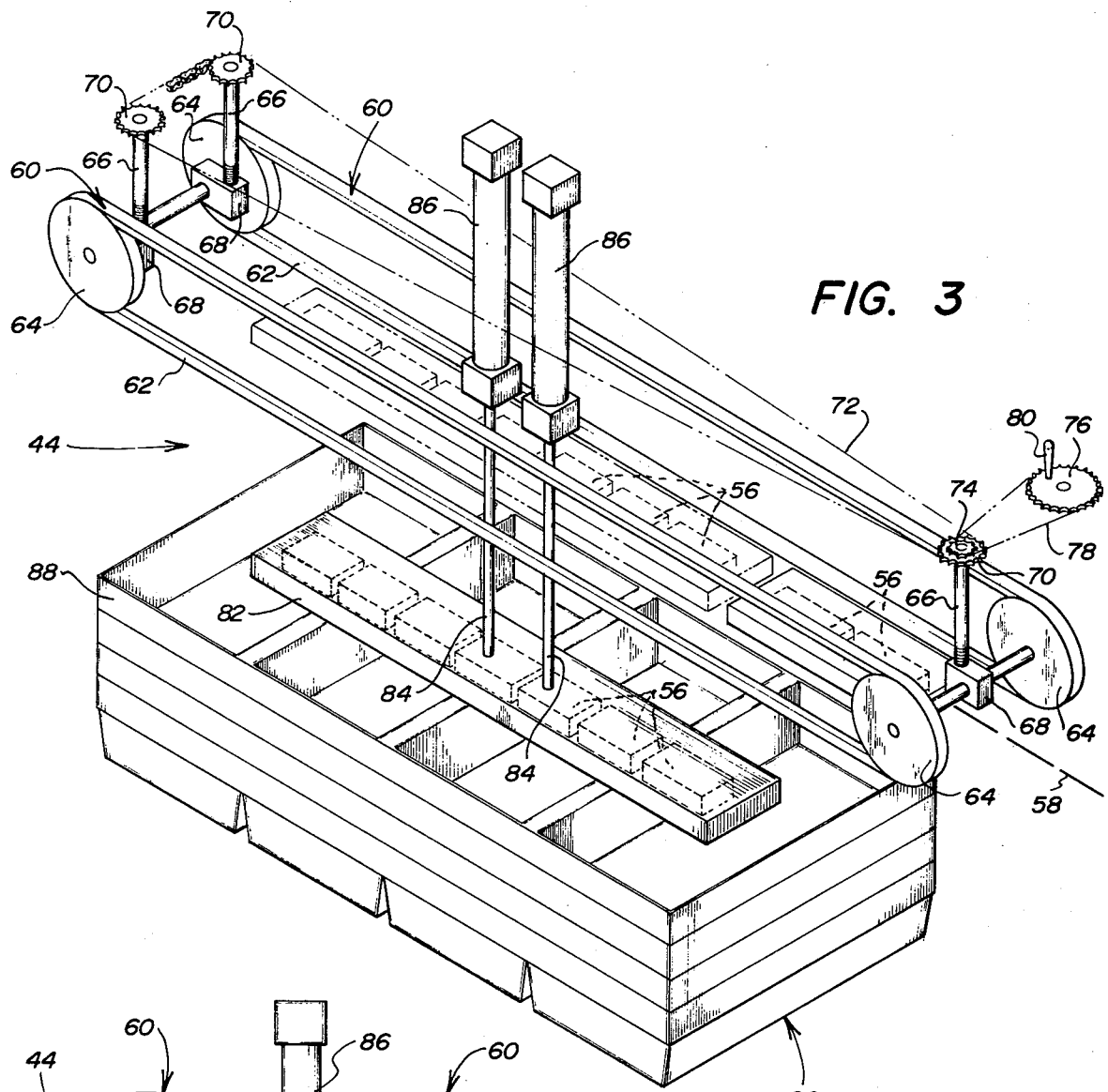
FIG. 3 is a perspective view of the pan transporting apparatus of the pan unstacking mechanism.
Figure 4:
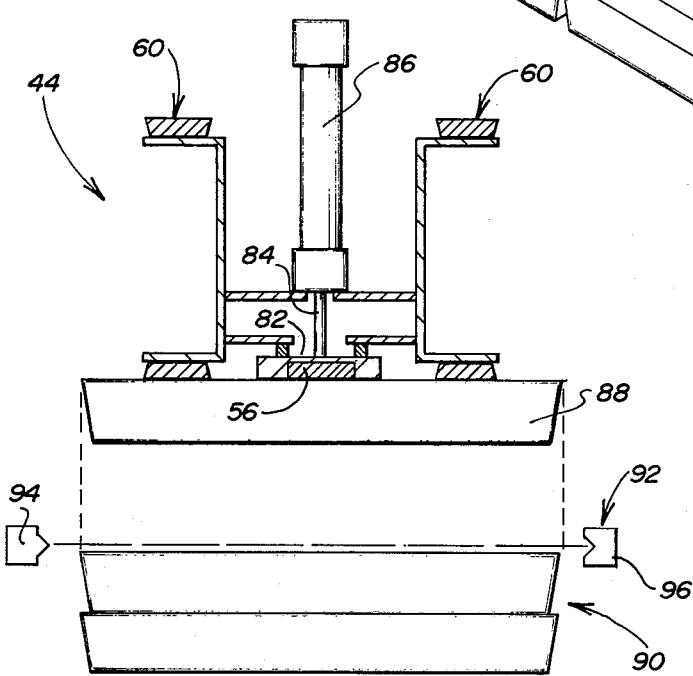
FIG. 4 is a sectional view further illustrating the apparatus of FIG. 3.
Figure 5:
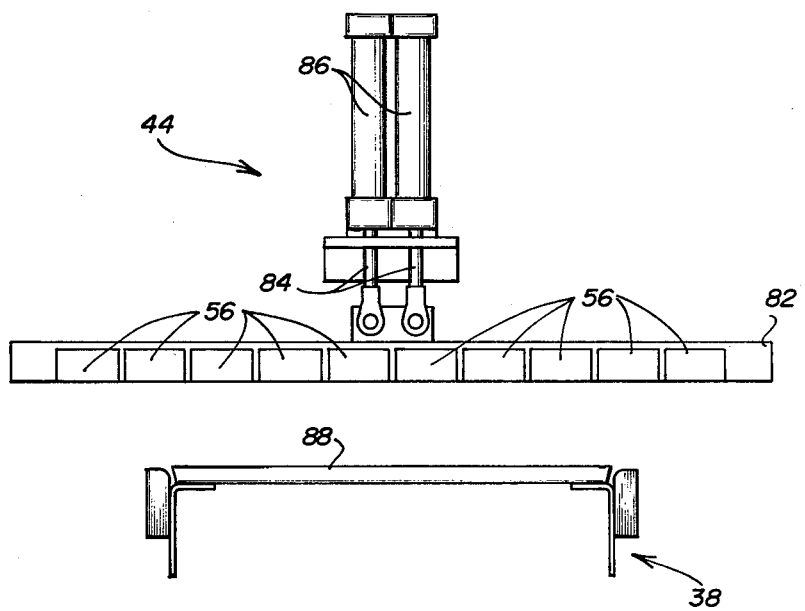
FIG. 5 is a side view further illustrating the apparatus of FIG. 3.

The operation of the pan transporting apparatus 44 of the pan unstacking mechanism 32 is illustrated in FIGS. 3, 4 and 5. A plurality of magnets 56 are mounted in a horizontal plane, and are disposed along a line 58. A pair of belts 60 are mounted for rotation around spaced, parallel courses extending on opposite sides of the line of magnets 58. The course of each belt 60 includes a portion 62 lying in the plane of the magnets 56.

The belts 60 preferably comprise conventional V-type power transmission belts. The courses of the belts 60 are defined by conventional pulleys 64, and the belts 60 may be driven by means of an electric motor having an output suitably connected to one of the pulleys 64 defining the course of each belt 60. The vertical positioning of the pan transporting apparatus 44 is regulated by means of a plurality of lead screws 66 which threadedly engage bearing blocks 68. Each lead screw 66 extends to a sprocket 70, and a chain 72 is constrained around all the sprockets 70, whereby the lead screws 66 may be rotated in unison. A second sprocket 74 is connected to one of the lead screws 66 and is drivingly connected to a sprocket 76 by means of a chain 78. The sprocket 76 is provided with a handle 80 whereby the lead screws 66 may be rotated to raise or lower the pan transporting apparatus 44, and thereby align the portions 62 of the courses of the belts 60 and the plane of the magnets 56, with the associated pan conveyor mechanism.

A substantial portion of the total number of magnets 56 are mounted in a frame 82 which is supported by piston rods 84 comprising a pair of pneumatic cylinders 86. The cylinders 86 are adapted for selective actuation to lower the magnets 56 supported by the frame 82 into engagement with the uppermost pan 88 comprising a stack of pans 90. The mounting of the frame 82 on the piston rods 84 is advantageous in the it allows the array of magnets 56 supported on the frame 82 to pivot into alignment with the uppermost pan 88 even though it may not be perfectly horizontally oriented. Thereafter, the cylinders 86 are retracted in order to return the magnets 56 supported by the frame 82 to their normal horizontal positioning.

Referring particularly to FIG. 4, it will be understood that the stack of pans 90 is supported by the stack positioning apparatus 38 of the unstacking mechanism 32. A stack height sensing system 92 includes a source 94 and at least one sensor 96. The stack height sensing system 92 functions in combination with the stack positioning apparatus 38 to maintain the uppermost pan of the stack in position for engagement by the magnets 56 supported by the frame 82.

When the cylinders 86 are actuated to lower the frame 82 and the magnets 56 supported thereby, the uppermost pan 88 from the stack 90 is siezed by the magnetic field of the magnets 56. Then, when the cylinders 86 are retracted, the uppermost pan 88 is raised under the action of the magnetic field of the magnets 56. When the magnets 56 have been returned to their normal horizontal positioning as illustrated in FIG. 4, the raised pan 88 is frictionally engaged with the belts 60. The belts 60 thereupon function to transport the pan laterally and to deliver the pan to the associated pan conveyor system. During the lateral movement of the pan under the action of the belts 60, the pan is supported by the magnetic field of the magnets 56.

Figure 6:
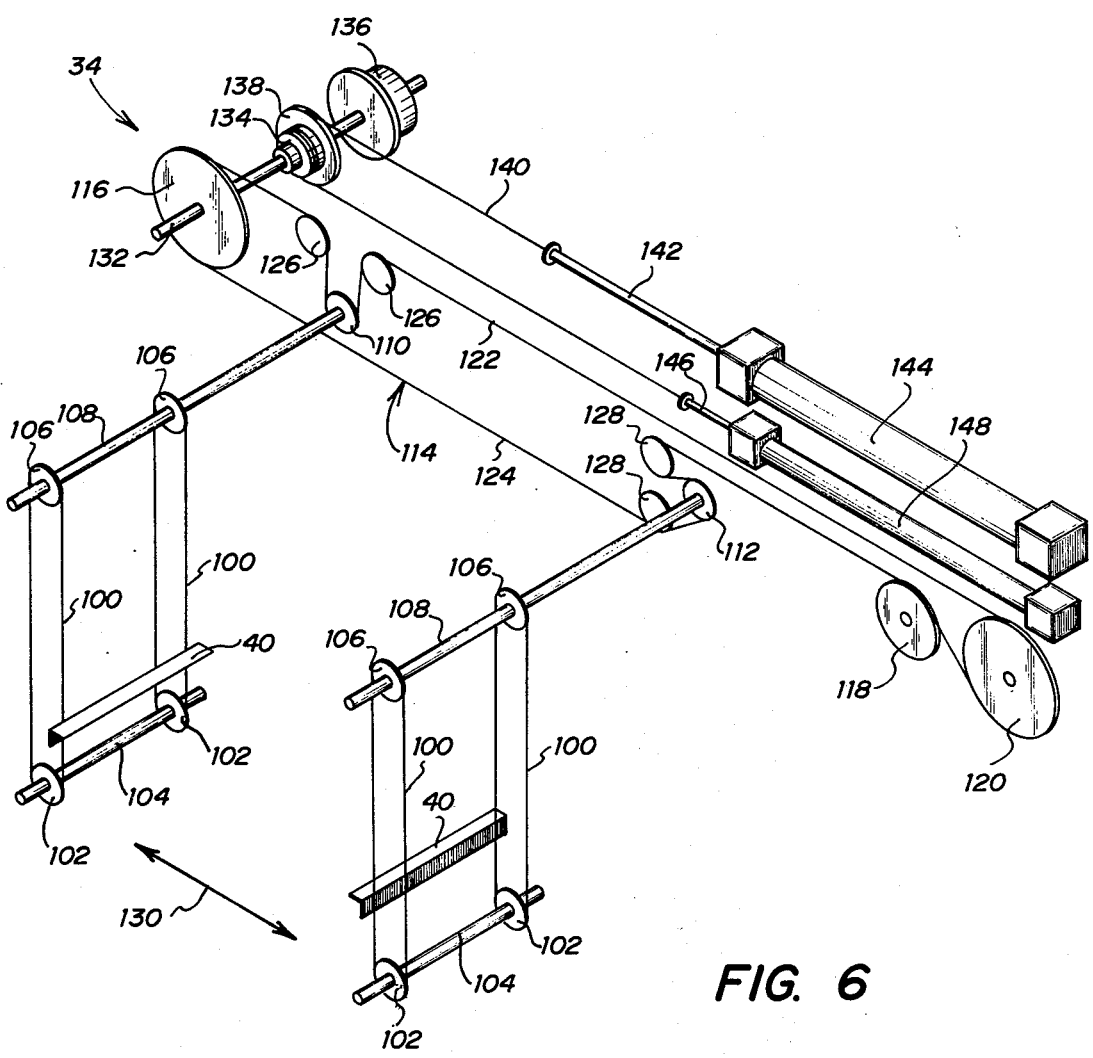
FIG. 6 is a schematic view illustrating the operation of the stack positioning apparatus of the pan unstacking mechanism of FIG. 1.

The construction and operation of the stack positioning apparatus 38 of the pan unstacking mechanism 32 are illustrated in FIGS. 6-11. Referring particularly to FIG. 6, the pan engaging members 40 are mounted on opposed pairs of spaced, parallel lift chains 100. Each of the lift chains 100 is constrained around a sprocket 102 mounted on an idler shaft 104 and a sprocket 106 mounted on a drive shaft 108. The two lift chain drive shafts 108 in turn extend to a pair of sprockets 110 and 112.

A drive chain 114 is constrained around a drive sprocket 116 and a pair of idler sprockets 118 and 120 to define an upper drive chain course 122 and a lower drive chain course 124. The drive sprocket 110 of one of the lift chain drive shaft 108 engages the chain 114 along the upper chain course 122, the chain 114 being maintained in engagement with the sprocket 110 by means of a pair of idler sprockets 126. The sprocket 112 of the other lift chain drive shaft 108 engages the chain 114 along the lower chain course 124, the chain 114 being maintained in engagement with the sprocket 112 by means of a pair of idler sprockets 128.

The pan engaging members 40, the lift chains 100, the sprockets 102, the idler shafts 104, the sprockets 106, the drive shafts 108, the sprockets 110 and 112 and the idler sprockets 126 and 128 are all carried by the subframes 50. In order to accommodate pans of various sizes in the pan unstacking mechanism 32, the subframes 50 are moved toward and away from each other in the manner indicated by the arrow 130. The fact that the sprockets 110 and 112 engage the chain 114 on the upper chain course 122 and the lower chain course 124, respectively, comprises a highly important feature of the present invention. Thus, by this means, movement of the subframe 50 and the component parts supported thereby in the manner indicated by the arrow 130 is permitted without changing the relative vertical positioning of the pan engaging members 40 with respect to each other.

The drive sprocket 116 is mounted on a power input shaft 132. A pneumatically operated clutch 134 and a pneumatically operated brake 136 are also mounted on the power input shaft 132. The brake 136 is normally actuated whereby the positioning of the pan engaging members 40 is locked, and a stack of pans supported thereby is maintained in a predetermined vertical position.

A power input sprocket 138 is mounted on the clutch 134. A power input chain 140 is constrained around the sprocket 138. The chain 140 is connected at one end to a piston rod 142 comprising a power pneumatic cylinder 144 and at the other end to a piston rod 146 comprising a tensioning pneumatic cylinder 148.

Whenever it is desired to raise a stack of pans supported by the pan engaging members 40, the clutch 134 is engaged, and the brake 136 is released. Substantially simultaneously the piston rod 142 of the power pneumatic cylinder 144 is retracted against the action of the tensioning pneumatic cylinder 148. This action causes rotation of the power input sprocket 138. Since the clutch 134 is engaged, the power input shaft 132 and the drive sprocket 116 are rotated. The motion of the sprocket 116 is imparted through the chain 114 and the sprockets 110 and 112 to the lift chain drive shafts 108. The drive shaft 108 in turn actuate the lift chains 100 through the sprockets 106. By this means the pan engaging members 40 and a stack of pans supported thereby are raised.

When the stack of pans has been raised by the desired amount, the brake 136 is actuated to maintain the stack of pans in its new vertical position. The pneumatic clutch 134 is thereafter released. The power penumatic cylinder 144 is then exhausted, whereupon the piston rod 142 is returned to the extended position under the action of the tensioning pneumatic cylinder 148.

The apparatus illustrated in FIG. 6 may also be utilized to lower a stack of pans supported by the pan engaging members. This is accomplished by releasing brake 136 and disengaging clutch 134.

The use of pneumatic cylinders to provide power for the stack positioning apparatus 38 comprises an important feature of the present invention. This is because in the event of a jam or similar malfunction, the system simply stalls but does not burn out or encounter similar difficulties such as might be encountered in the operation of an electrical system. Likewise, the use of pneumatic cylinders to power the stack positioning apparatus 38 is advantageous in that no power is consumed except during the actual use of the apparatus to position a stack of pans.

The construction of the pan engaging members 40 is illustrated in FIGS. 7 and 8. The lift chains 100 are rollers chains. A pair of brackets 150 are secured to the lift chains 100 by means of elongate pins 152. A member 154 having an inverted L-shaped cross-section is secured to the brackets 150 and is adapted for engagement with the bottom of the lowermost pan of a stack of pans. A pair of members 156 containing rollers 157 extends upwardly from the member 154. Rollers 157 engage with the side of the subframe 50, thereby preventing the pan engaging member 40 from tipping inwardly.

The construction of the drive mechanism for the stack positioning apparatus 38 of the pan unstacking mechanism 32 is further illustrated in FIGS. 9 and 10. The subframe 52 includes a pair of channel sections 160. The power input shaft 132 is rotatably supported in the channel sections by means of bearings 162. The idler sprockets 120 and 118 are supported on shafts 164 and 166, respectively. The shafts 164 and 166 are rotatably supported by bearings 168 and 170, respectively. The positioning of the bearing 168 and therefore the shaft 164 and the idler sprocket 120 supported thereby is adjustable to vary the tension of the drive chain 114. The power pneumatic cylinder 144 and the tension pneumatic cylinder 148 are also supported by the subframe 52. The piston rod 142 of the power pneumatic cylinder 144 is shown in the extended position in FIG. 9.

The mechanism for varying the positioning between the subframes 50 and thereby accommodating pans of various sizes in the pan unstacking mechanism 32 is illustrated in FIGS. 1 and 11. A pair of lead screws 174 are disposed on opposite sides of the subframes 50. Each lead screw 174 includes a right-hand threaded portion 176 and a left-hand threaded portion 178. Internally threaded members 180 are threadedly engaged with the threaded portions of the lead screws 174 and are in turn secured to the subframes 50.

A right-hand threaded lead screw 182 is positioned below the right-hand threaded portions 176 of the lead screws 174. Likewise a left-hand threaded lead screw 184 is positioned below the left-hand threaded portions of the lead screws 174. The lead screws 174, 182 and 184 are constrained to equal angular displacement by means of chains 186 and suitable sprockets connected to the lead screws. Likewise the two lead screws 174 are constrained to equal angular displacement by means of chains 188 and suitable sprockets connected to the lead screws. By this means a hand wheel 190 may be utilized to simultaneously rotate all of the lead screws 174, 182 and 184, and thereby position the subframes and the component parts carried thereby in the proper spacial relationship as indicated by the arrow 130.

The pan stacking mechanism 34 of the pan unstacking and stacking system 30 is illustrated in FIGS. 2 and 12-16. Many of the component parts of the pan stacking mechanism 34 are substantially identical in construction and function to component parts of the pan unstacking mechanism 32. These component parts are designated in FIGS. 2 and 12-16 with the same reference numerals utilized hereinbefore in the description of the pan unstacking mechanism 32, but are differentiated therefrom by means of a prime (') designation.

The pan stacking mechanism 34 includes a pan transporting apparatus 44' which receives individual pans from an associated pan conveying apparatus. The individual pans enter the pan stacking mechanism 34 traveling in the direction indicated by the arrow 196. The pan transporting apparatus 44' functions to position each pan over a stack positioning apparatus 38'. The pan is then dropped into the stack positioning apparatus '" and is received either by the pan engaging members 40' or by a previously received pan. When a complete stack of pans has been accumulated, the stack is lowered by the stack positioning apparatus 38' in the direction indicated by the arrow 198. The stack of pans is subsequently removed in the direction indicated by the arrow 200. The stack may be removed either by a suitable conveyor or by means of a lift truck or other suitable apparatus.

Figure 12:
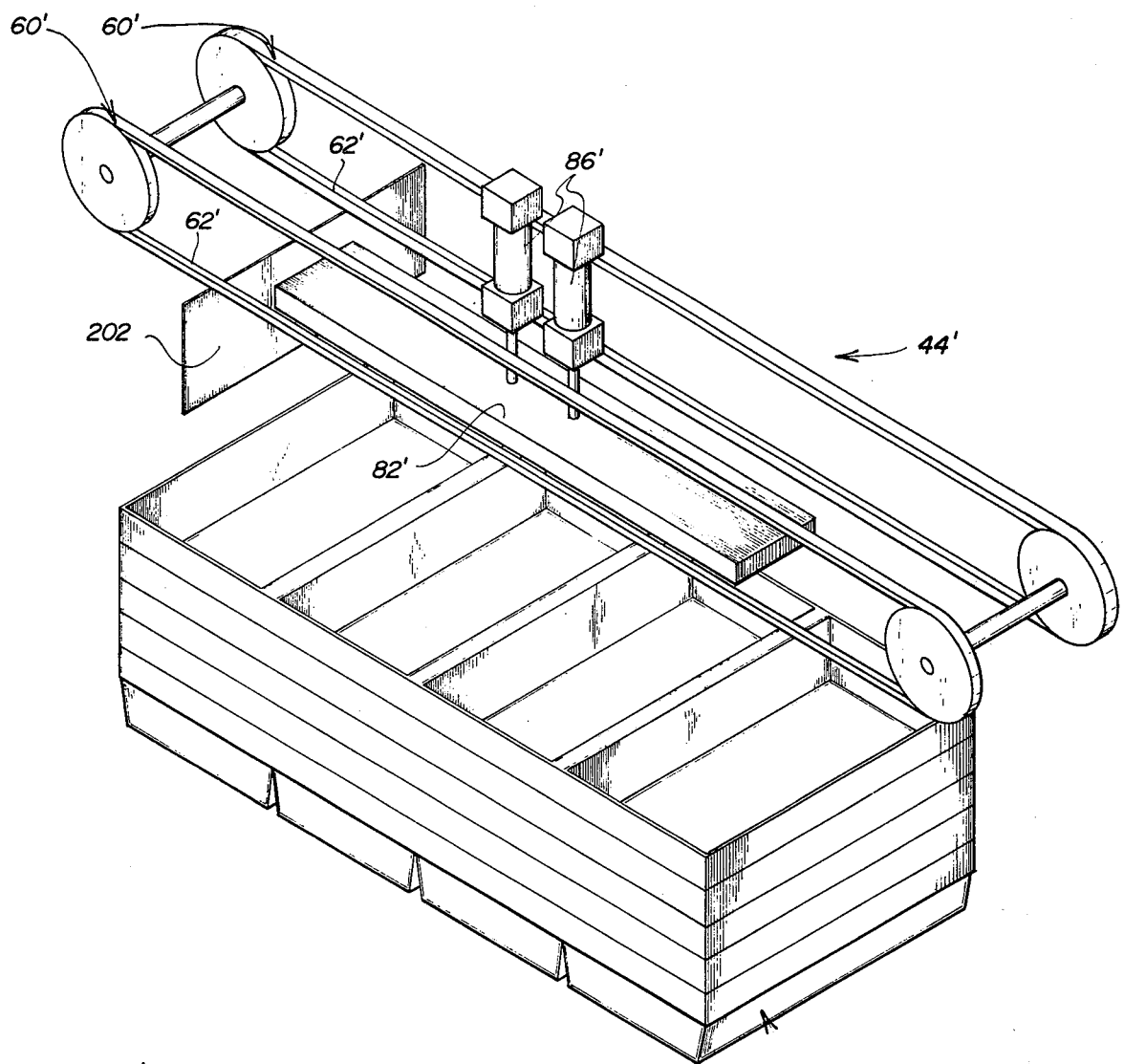
FIG. 12 is a perspective view of the pan transporting apparatus of the pan stacking mechanism of FIG. 2.
Figure 13:
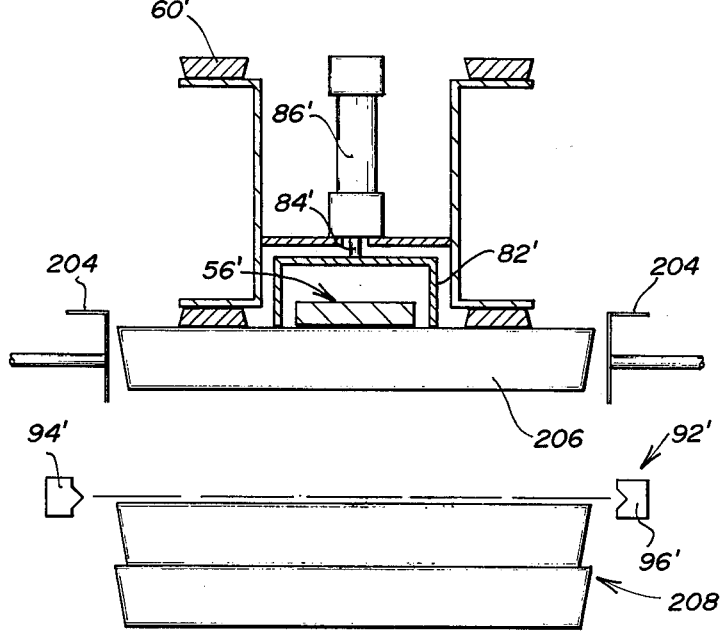
FIG. 13 is a further illustration of the apparatus of FIG. 12.
Figure 14:
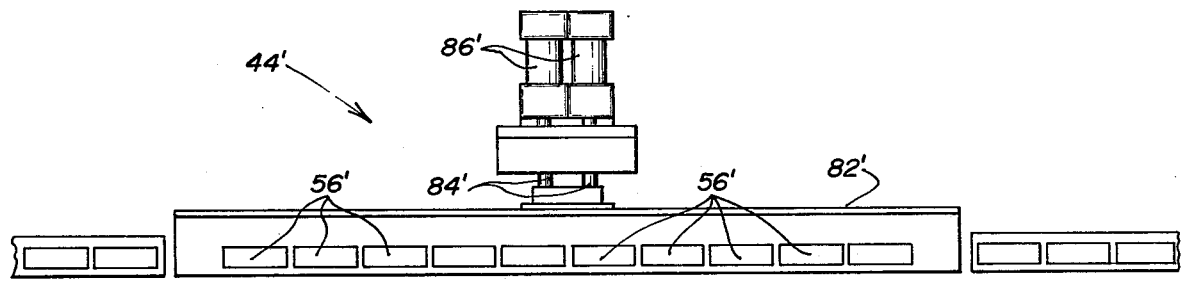
FIG. 14 is a longitudinal sectional view further illustrating the apparatus of FIG. 12.

Referring to FIGS. 12, 13 and 14, individual pans entering the stacking mechanism 34 are seized by the magnetic field of the magnets 56'. Each pan is then transported by the belts 60' until it engages a stop 202. At this point the pan is properly positioned over the stack positioning apparatus 38'. Correct laterial positioning of the entering pan is assured by guides 204.

A primary distinction between the pan transporting apparatus 44' of the stacking mechanism 34 and the pan transporting apparatus 44 of the unstacking mechanism 32 involves the fact that the frame 82' of the apparatus 44' does not support the magnets 56'. To the contrary, the frame 82' is mounted for relative movement with respect to the magnets 56'. Therefore, when a pan 206 is properly positioned over the stack positioning apparatus 38', and the cylinders 86' are actuated, the frame 82' moves downwardly but the magnets 56' remain fixed in place. The pan 206 is therefore disengaged from the magnetic field of the magnets 56' and falls into the stack positioning apparatus 38'. The falling pan is received either by the pan engaging members 40' or on top of a previously stacked pan. The stack height sensing system 92' maintains the uppermost pan of the stack 208 at a predetermined maximum distance from the magnets 56' so that the pan 206 does not fall so far as to possibly become damaged.

Those skilled in the art will appreciate the fact that whereas the pneumatic cylinders 86 of the pan unstacking mechanism 32 must have sufficient stroke to engage the magnets 56 carried by the frame 82 with the uppermost pan 88 of the stack 90, the frame 82' of the pan stacking mechanism 34 needs to descend only far enough to disengage the pan 206 from the field of the magnets 56'. Therefore, the pneumatic cylinders 86' of the pan stacking mechanism 34 are typically considerably shorter in stroke than the pneumatic cylinders 86 of the pan unstacking mechanism 32.

Figure 16:
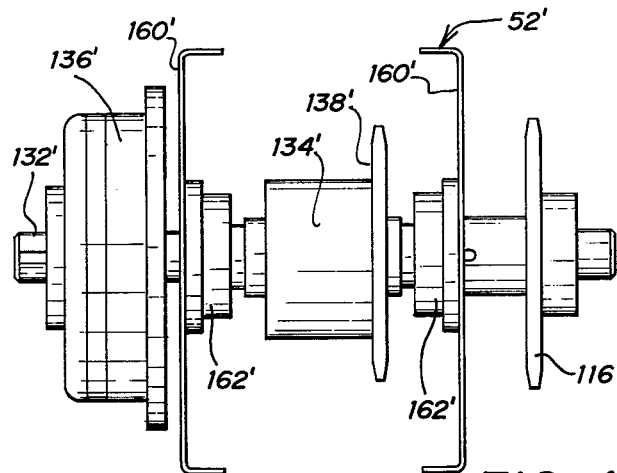
FIG. 16 is an illustration of the clutch and brake structure of the apparatus of FIG. 15.
Figure 15:
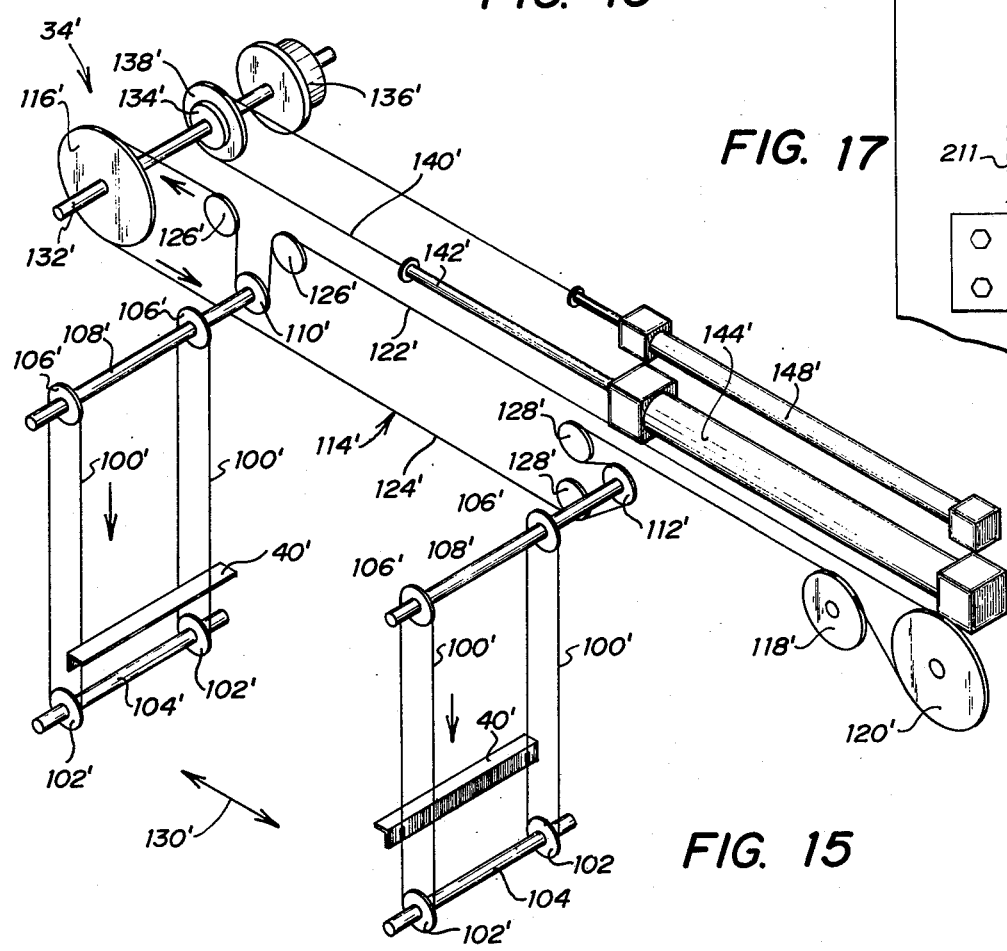
FIG. 15 is a perspective view of the stack positioning apparatus of the pan stacking mechanism of FIG. 2.

The stack positioning apparatus 38' of the pan stacking mechanism 34 is illustrated in FIGS. 15 and 16. The primary distinction between the stack positioning apparatus 38' of the pan stacking mechanism 34 and the stack positioning apparatus 38 of the pan unstacking mechanism 32 involves a difference between the clutches utilized to connect the power input sprockets to the power input shafts. In the pan unstacking mechanism 34, the stack positioning apparatus 38 must be capable of both raising and lowering a stack of pans. Therefore, the clutch 134 which is utilized to connect the power input sprocket 138 to the power input shaft 132 comprises a pneumatic clutch which is selectively operable to connect the sprocket 138 to the shaft for concurrent rotation in one direction, to connect the sprocket to the shaft for concurrent rotation in the opposite direction, or to disconnect the sprocket from the shaft.

Conversely, in the pan stacking mechanism 34, the stack positioning apparatus 38' need only function to lower a stack of pans supported on the pan engaging members 40'. Therefore, the stack positioning apparatus 38' utilizes a one way clutch 210 to connect the sprocket 138' to the shaft 132' for concurrent rotation therewith in response to rotation of the sprocket 138' in one direction, and to disconnect the sprocket 138' from the shaft 132' in response to rotation of the sprocket 138' in the opposite direction. Other than this distinction, the stack positioning apparatus 38' is substantially identical in construction and operation to the stack positioning apparatus 38.

Figure 17:
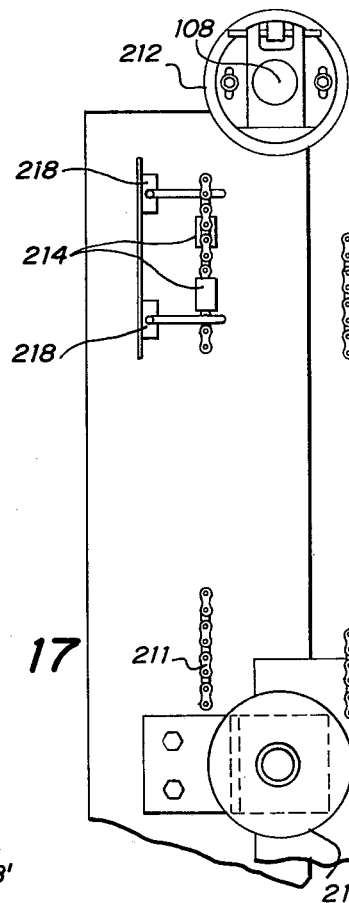
FIG. 17 is an illustration of the timing mechanism for the pan stacking and unstacking system.

Both the unstacking mechanism 32 and the stacking mechanism 34 of the pan unstacking and stacking system 30 include a timing mechanism of the type shown in FIG. 17. A roller chain 211 is constrained around a pair of sprockets 212. The upper sprocket 212 is driven by the shaft 108 (the shaft 108' in the stacking mechanism). A pair of valve actuators 214 are mounted on opposite sides of the roller chain 211. The valve actuators 214 are positioned to actuate a pair of valves 218, respectively.

The function of the valves 218 is to indicate the upper and lower limits of vertical travel of the pan engaging members 40 (or 40'). The timing mechanism of the unstacking and stacking mechanism are identical, except for the fact that the chain 211 travels in opposite directions in the two devices. Additionally, the positioning of the valve 218 indicating the lower limit of travel of the pan engaging members relative to the opposite valve 218 is reversed in the unstacking mechanism relative to the positioning of the two valves in the stacking mechanism.

Figure 18:
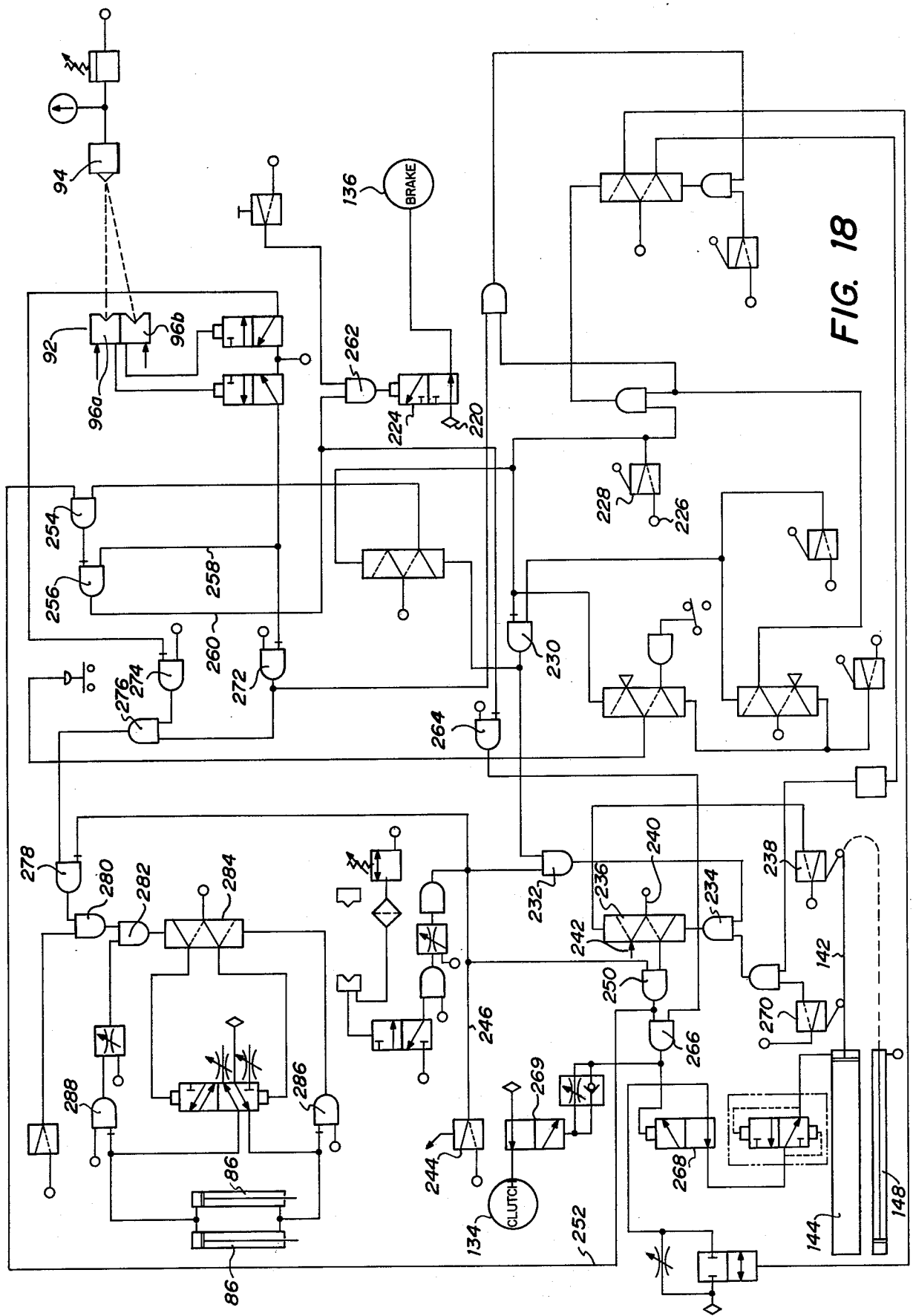
FIG. 18 is a schematic illustration of the pneumatic logic circuitry of the pan unstacking mechanism of FIG. 1.

A more complete understanding of the operation of the pan unstacking mechanism 32 may be had by reference to FIG. 18 which comprises a schematic illustration of a pneumatic control circuit for the mechanism. Compressed air operating pressure is received in a port 220 and directed through a valve 224 to set the brake 136. Assuming that a stack of pans is properly positioned in the stack positioning apparatus 38, compressed air at control pressure is received in a port 226 and is directed through a valve 228 to a NOT gate 230. The presence of an input signal at the NOT gate 230 de-energizes the output of the NOT gate 230.

The output of the NOT gate 230 is connected through an OR gate 232 and an OR gate 234 to a flip-flop 236. At this point the piston rod 142 of the power pneumatic cylinder 144 is fully extended, whereupon a valve 238 directs a signal to the flip-flop 236, thereby connecting the input 240 of the flip-flop 236 to a blind output 242. A mode selector valve 244 is assumed to be in the unstack position whereby no signal is applied to a line 246. Therefore, an OR gate 250 connected to the line 246 and to the output of the flip-flop 236 does not produce an output. This lack of output from the gate 250 is communicated through a line 252 and an OR gate 254 to a NOT gate 256.

The stack sensing system 92 includes the source 94 and a pair of sensors 96a and 96b. Assuming that the stack sensing system 92 does not sense the presence of a stack of pans in position for unstacking, a signal is applied to the gate 256 through a line 258. An output signal is therefore directed from the gate 256 through a line 260 to an OR gate 262 which actuates the valve 224 to release the brake 136.

The output from the gate 256 is also directed to a NOT gate 264 which therefore produces no output. The simultaneous lack of output from the gate 264 and the gate 250 causes no output from an OR gate 266. This condition causes a valve 268 to direct compressed air at operating pressure to the rod end of the power operating cylinder 144, whereby the piston rod 142 of the cylinder 144 is retracted. The lack of an output signal from the gate 266 also causes a valve 269 to direct air at operating pressure to the clutch 134 which is thereby engaged.

The system normally cycles under the control of the stack height sensing system 92 to release the brake 136, engage the clutch 134 and partially retract the piston rod 142, and to subsequently set the brake 136, disengage the clutch 134 and release the piston rod 142. In the event that the piston rod 142 should become fully retracted, a valve 270 functions to set the brake 136 and to simultaneously extend the piston rod 142 until the valve 238 is engaged. In this manner the system continuously positions a stack of pans with the uppermost pan of the stack positioned to be unstacked.

The sensors 96a and 96b of the stack position sensing system 92 operates through a pair of NOT gates 272 and 274, an OR gate 276, a NOT gate 278, an OR gate 280 and an AND gate 282 to control the operation of the cylinders 86 by means of a flip-flop 284. A NOT gate 286 senses the completion of the stroke of the cylinders 86 and thereby actuates the flip-flop 284 to initiate the retraction of the cylinders. Return of the cylinders 86 to the retracted position actuates a NOT gate 288 which initiates a timing cycle that must be completed before another operating cycle of the cylinders 86 can be initiated.

Figure 19:
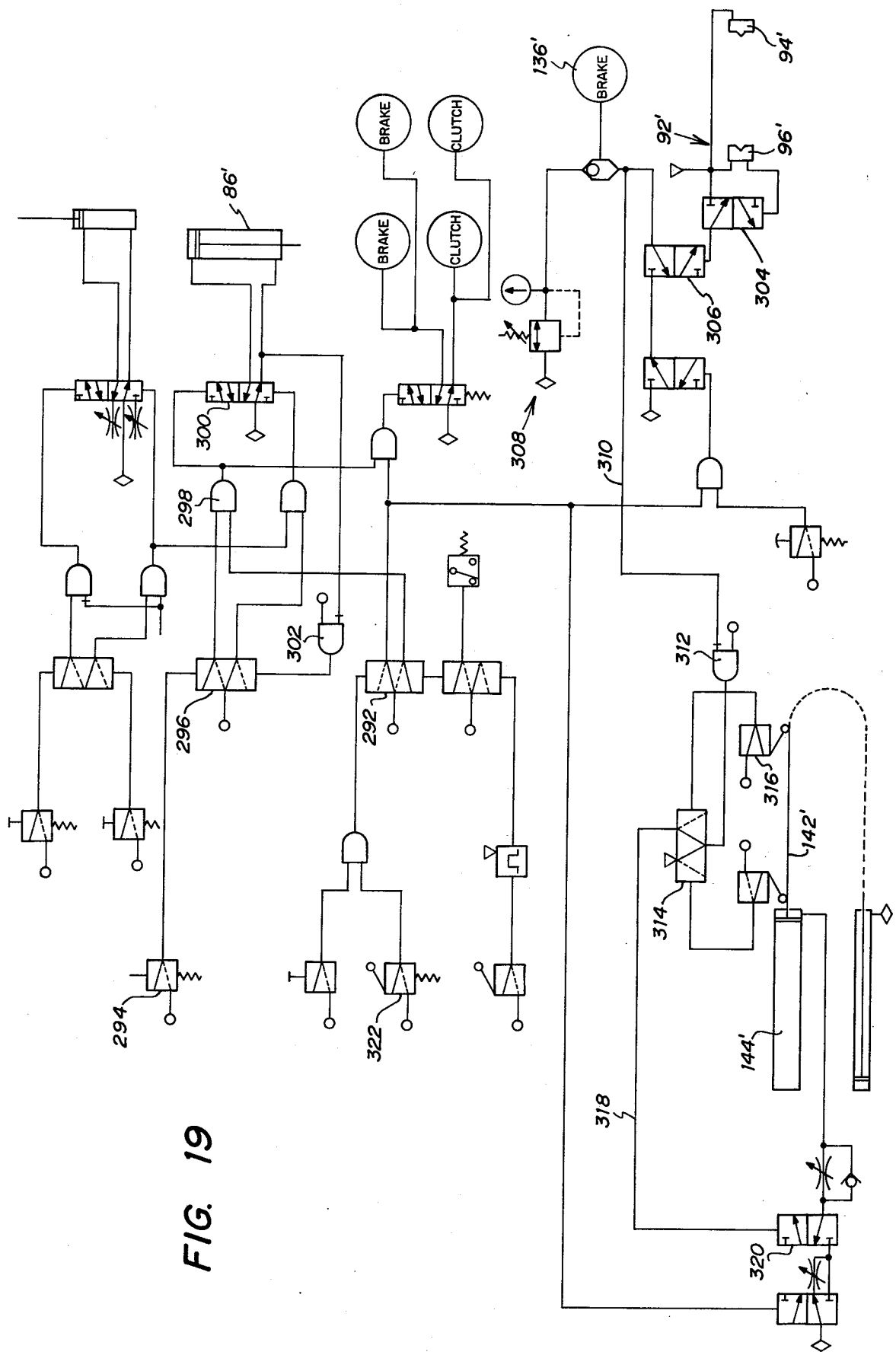
FIG. 19 is a schematic illustration of the pneumatic logic circuitry of the pan stacking mechanism of FIG. 2.

Referring now to FIG. 19, there is shown a schematic illustration of a pneumatic logic circuit for the pan stacking mechanism 34. A flip-flop 292 generates a signal indicating that the stack positioning apparatus 38' is in condition to receive a stack of pans. Thereafter, the arrival of a pan in the pan transporting apparatus 44' actuates a valve 294 which actuates a flip-flop 296. The output of the flip-flop 296 and the output of the flip-flop 292 are combined in an AND gate 298, whereupon a valve 300 is actuated to initiate a cycle of operation of the cylinders 86'. By this means the pan is disengaged from the magnetic field of the magnets 56' and is dropped into the stack positioning apparatus 38'. When the cylinders 86' have been completely extended, a NOT gate 302 directs a signal to the flip-flop 296 to reset the apparatus to the original condition.

The stack height sensing system 92' generates an output whenever the path between the source 94' and the sensor 96' is clear. Assuming that a pan is positioned in this path, no output is generated by the sensor 96'. A valve 304 therefore generates no output to a valve 306 which functions to relax the braking effort of the brake 136'. A subcircuit 308 functions to maintain a minimum braking effort on the brake 136' so that the brake is not released too rapidly.

The lack of an output signal from the valve 306 is directed through a line 310 to a NOT gate 312 which functions to direct compressed air at control pressure to a flip-flop 314. At this point the piston rod 142' of the power pneumatic cylinder 144' is fully extended. Therefore, a valve 316 actuates the flip-flop 314 to generate a signal on a line 318. This signal operates a valve 320 to lower the load supported in the stack positioning apparatus 38' against the resistance of the brake 136', it being understood that the brake 136' is in a relaxed condition at this time, but nevertheless functions to control the lowering speed of the stack.

The foregoing cycle of operation is repeated until a valve 322 senses the presence of a full stack. At this point the flip-flop 292 is actuated to perform two functions. First, the brake 136' is relaxed and the power pneumatic cylinder 144' is actuated to lower the stack of pans in the manner previously described. Second, the signal is removed from the AND gate 198, whereby further pan stacking operations of the cylinders 86' are prevented until the full stack of pans has been removed from the mechanism.

From the foregoing, it will be understood that the present invention comprises a pan unstacking and stacking system incorporating numerous advantages over the prior art. Thus, by means of the invention, there is provided a system for reliably removing individual pans from pan stacks and delivering each pan to an associated pan conveying mechanism. The system also functions to subsequently receive individual pans from the pan conveying mechanism and to accumulate the received pans in stacks. A further advantage deriving from the use of the invention involves the fact that pneumatic cylinders are utilized to position pan stacks vertically, thereby eliminating any possibility of burnout or similar failures such as might be encountered in an electrical system. The use of the invention is further advantageous in that by means thereof a pan unstacking and stacking system is readily adapted for use with pans of various widths. Other advantages inherent in the present invention will readily suggest themselves to those skilled in the art.

Although preferred embodiments of the invention have been illustrated in the accompanying Drawings and described in the foregoing Detailed Description, it will be understood that the invention is not limited to the embodiments disclosed, but is capable of numerous rearrangements, modifications and substitutions of parts and elements without departing from the spirit of the invention.

What is claimed is:

1. A pan unstacking and stacking system comprising:
    opposed pairs of spaced, parallel, substantially vertically disposed lift chains, each constrained around lift sprockets mounted on spaced, parallel shafts;
    at least one pair of opposed pan engaging members each mounted on the lift chains comprising one of the pairs for movement thereby into engagement with the lowermost pan comprising a vertical stack of pans;
    means for selectively varying the spacing between the pairs of spaced, parallel lift chains and the pan engaging members thereon and thereby accommodating pans of various sizes;
    one of the shafts which support the lift sprockets engaged with each pair of lift chains comprising a drive shaft and extending to a drive sprocket;
    a drive chain constrained around the drive sprockets secured to each of the drive shafts and around a drive sprocket mounted on a power input shaft;
    clutch means mounted on the power input shaft for selectively forming a driving connection thereto;
    brake means for selectively preventing rotation of the power input shaft and thereby operating through the power input shaft, the drive sprocket mounted thereon, the drive chain, the drive sprockets secured to the drive shafts having the lift chain engaging sprockets mounted thereon, the drive shafts and the lift sprockets mounted thereon, the lift chains and the pan engaging members to maintain a stack of pans supported on the pan engaging members in a predetermined vertical positioning;
    a power input sprocket mounted on the clutch means;
    a power input chain constrained around the power input sprocket;
    fluid powered cylinder means including a rod connected to the power input chain for selective actuation through the power input sprocket, the clutch means, the power input shaft, the drive sprocket mounted therein, the drive chain, the drive sprockets mounted on the drive shaft, the lift sprockets mounted on the drive shafts, and the lift chains to control the vertical positioning of a stack of pans supported by the pan engaging members on the lift chains;
    a plurality of magnets mounted along a line in a horizontal plane situated directly above the stack of pans supported on the pan engaging members on the lift chains; and
    a pair of belts mounted for rotation in vertical planes situated on either side of the line magnets;
    each of said belts being mounted for rotation around a course including a horizontal portion extending substantially coincident with the plane of the magnets;
    whereby a pan supported by the magnetic field of the magnets is transported laterally by frictional engagement with the moving belts;
    at least one idler sprocket;
    said drive chain being constrained around the idler sprocket in addition to the drive sprocket mounted on the power input shaft to define an upper course and a lower chain course;
    one of the drive shafts having the lift chain engaging sprocket mounted thereon engaging the drive chain along the upper chain course; and
    the other drive shaft having the lift chain engaging sprocket mounted thereon engaging the drive chain along the lower chain course, thereby facilitating changing the spacing between the pan engaging members without changing the relative vertical positioning therebetween.

2. The pan unstacking and stacking system according to claim 1 wherein the positioning varying means comprises:
    a pair of subframes each rotatably supporting the shafts having the lift sprockets mounted thereon;
    at least one lead screw having opposed right-hand threaded and left-hand threaded positions;
    means threadedly engaging the right-hand threaded and left-hand threaded portions of the lead screw and connected to the subframe; and
    means for selectively rotating the lead screw and thereby varying the positioning between the subframe and the lift chains and the pan engaging members mounted thereon.

3. The pan unstacking and stacking system according to claim 1 wherein the clutch means comprises one way clutch means so that the power input shaft is rotated responsive to rotation of the power input sprocket in one direction but is not rotated in response to rotation of the power input sprocket in the other direction.

4. The pan unstacking and stacking system according to claim 1 wherein the clutch means is selectively operable to cause rotation of the power input shaft in response to rotation of the power input sprocket in either direction and also to selectively disengage the power input sprocket from the power input shaft.

5. The pan unstacking and stacking system according to claim 1 further including means for maintaining a predetermined minimum spacing between the uppermost pan in the stack and the horizontal plane of the magnets.

6. The pan unstackinzg and stacking system according to claim 1 further characterized by:
    means for arresting movement of a pan supported by the magnetic field of the magnets when the pan has been positioned by the belts over the stack of pans; and
    means for thereafter moving the pan downwardly relative to the plane of the magnets and thereby disengaging the pan from the magnetic field of the magnets and dropping the pan onto the stack.

7. The pan unstacking and stacking system according to claim 1 further characterized by means for selectively lowering at least certain of the magnets until the uppermost pan of the stack is siezed by the magnetic field of the magnets and for thereafter raising the magnets and the pan to engage the pan with the belts.

8. In a pan stacking and unstacking system, apparatus for vertically positioning pan stacks comprising:
  fluid powered cylinder means including a selectively extendable rod;
  a power input chain connected at one end of the rod of the fluid powered cylinder means;
  a power input sprocket having the power input chain constrained therearound;
  a power input shaft;
  clutch means for selectively coupling the power input sprocket to the power input shaft;
  a drive sprocket mounted on the power input shaft;
  spaced parallel drive shafts;
  a pair of drive sprockets each mounted on one of the spaced, parallel drive shafts;
  a drive chain constrained around the drive sprocket on the power input shaft and the drive sprockets on the spaced, parallel drive shafts;
  two pairs of spaced apart lift sprockets, each pair being mounted on one of the spaced, parallel drive shafts;
  opposed pairs of spaced, parallel lift chains each constrained around one on the lift sprockets; and
  at least one pair of opposed pan engaging members each mounted on a lift chain comprising one of the pairs for movement thereby into engagement with the lowermost pan comprising a stack of pans;
  whereby the fluid powered cylinder means operates through the power input chain, the power input sprocket, the clutch means, the power input shaft, the drive sprocket mounted on the power input shaft, the drive chain, the drive sprockets mounted on the spaced, parallel shafts, the spaced, parallel shafts, the lift sprockets, and the lift chains to control the vertical positioning of the end engaging members and a stack of pans supported thereby; and
  biasing means connected to the opposite end of the power input chain from the fluid powered cylinder means for maintaining tension on the power input chain.

9. The pan stack positioning apparatus according to claim 8 wherein the biasing means and the fluid powered cylinder means both comprise pneumatic cylinders.

10. The pan stack postioning apparatus according to claim 8 wherein the power input sprocket is mounted on the clutch means, and wherein the clutch means is mounted on the power input shaft.

11. The pan stack positioning apparatus according to claim 10 wherein the clutch means comprises one way clutch means so that the power input shaft is rotated responsive to rotation of the power input sprocket in one direction but is not rotated in response to rotation of the power input shaft in the opposite direction.

12. The pan stack positioning apparatus according to claim 10 wherein the clutch means is selectively operable to:
  rotate the power input shaft responsive to rotation of the power input sprocket in one direction; or
  rotate the power input shaft responsive to rotation of the power input sprocket in the opposite direction; or
  disengage the power input shaft entirely from the power input sprocket.

13. The pan stack positioning apparatus according to claim 8 further including brake means for selectively preventing rotation of the power input shaft and the drive sprocket connected thereto and thereby operating through the power input shaft, the drive sprocket connected thereto, the drive chain, the drive sprockets connected to the spaced parallel shafts, the lift sprockets mounted thereon and the lift chains to control the vertical positioning of the pan engaging members and a stack of pans supported thereon.

14. In a pan stacking and unstacking system, apparatus for vertically positioning pan stacks comprising:
  a pair of spaced apart, vertically oriented subframes;
  two pairs of vertically spaced shafts each rotatably supported on one of the subframes;
  each of the shafts having a pair of spaced apart lift sprockets mounted thereon;
  two pairs of spaced, parallel lift chains constrained around the lift sprockets of the shafts and supported thereby for substantially vertical movement relative to the subframes;
  at least one pair of opposed pan engaging members each mounted on the lift chains comprising one of the pairs for movement thereby into engagement with the lowermost pan comprising a stack of pans;
  one shaft of each pair of shafts comprising a drive shaft and having a drive sprocket mounted thereon;
  a power input drive sprocket;
  at least one idler sprocket;
  a drive chain constrained around the power input drive sprocket and the idler sprocket to define an upper chain course and a lower chain course;
  the drive chain engaging the drive sprocket on one of the drive shafts along the upper chain course and engaging the drive sprocket on the other drive shaft along the lower chain course;
  means for selectively rotating the power input drive sprocket and thereby selectively varying the vertical positioning of the pan engaging members and a stack of pans supported thereby; and
  means for selectively varying the spacing between the subframes and the pairs of lift chains and the pan engaging members supported thereby and thereby accommodating pans of various sizes.

15. The pan stack positioning apparatus according to claim 14 wherein the means for selectively varying the spacing between the subframe and the pairs of lift chains and the pan engaging members mounted thereon comprises:
  at least one lead screw having left-hand threaded and right-hand threaded portions;
  means threadedly engaging the left-hand threaded and right-hand threaded portions and secured to the subframes; and
  means for selectively rotating the lead screw and thereby varying the positioning between the subframes.

16. The pan stack positioning apparatus according to claim 15 further characterized by:
  a pair of lead screws mounted on opposite sides of the subframes and each having left-hand threaded and right-hand threaded portions;
  two pairs of members threadedly engaging the left-hand threaded and right-hand threaded portions of both of the lead screws, each of said members being secured to one of the subframes; and
  means constraining the lead screws to equal angular displacement.

17. The pan stack positioning apparatus according to claim 14 further characterized by two pairs of idler sprockets each pair being mounted on one of the subframes and each pair for maintaining the drive chain in engagement with the drive sprocket secured to the drive shaft rotatably supported on the subframe.

18. The pan stack positioning apparatus according to claim 14 wherein the power input sprocket is mounted on a power input shaft for rotation therewith and further including brake means for selectively preventing rotation of the power input shaft and thereby maintaining a predetermined vertical positioning of a stack of pans supported on the pan engaging members.

19. The pan stack positioning apparatus according to claim 18 wherein the means for selectively rotating the drive sprocket comprises means for selectively rotating the power input shaft and clutch means mounted on the power input shaft for selective actuation to couple the shaft rotating means thereto.

20. The pan stack positioning apparatus according to claim 19 wherein the shaft rotating means comprises a power input sprocket mounted on the clutch means, a power input chain constrained around the power input sprocket, and fluid powered cylinder means for selectively rotating the power input sprocket by means of the power input chain.

21. The pan stack positioning apparatus according to claim 20 wherein the clutch means comprises one way clutch means so that the power input shaft is rotated responsive to rotation of the power input sprocket in one direction and is not rotated responsive to rotation of the power input sprocket in the opposite direction.

22. The pan stack positioning apparatus according to claim 20 wherein the clutch means is selectively operable to rotate the power input shaft in response to rotation of the power input sprocket in one direction, or to rotate the power input shaft in response to rotation of the power input sprocket in the opposite direction, or to disengage the power input shaft from the power input sprocket.

23. The pan stack positioning apparatus according to claim 20 wherein the fluid powered cylinder means comprises a pneumatic cylinder having a rod connected to one end of the power input chain and further including a second pneumatic cylinder having a rod connected to the opposite end of the power input chain for applying a predetermined tension thereto.

24. In a pan stacking and unstacking system, apparatus for vertically positioning pan stacks comprising:
opposed pairs of spaced, parallel lift chains each constrained around lift sprockets mounted on spaced, parallel shafts;
at least one pair of opposed pan engaging members each mounted on the lift chains comprising one of the pairs for movement thereby into engagement with the lowermost pan comprising a stack of pans;
one of the shafts which support the lift sprockets comprising a drive shaft and extending to a drive sprocket;
a drive chain constrained around the drive sprockets secured to each of the drive shafts and around a drive sprocket mounted on a power input shaft;
clutch means mounted on the power input shaft for selectively forming a driving connection thereto;
a power input sprocket mounted on the clutch means;
a power input chain constrained around the power input sprocket;
fluid powered cylinder means including a rod connected to the power input chain for selective actuation through the power input sprocket, the clutch means, the power input shaft, the drive sprocket mounted therein, the drive chain, the drive sprockets mounted on the drive shaft, the lift sprockets mounted on the drive shafts and engaged with the lift chains, and the lift chains to control the vertical positioning of a stack of pans supported by the pan engaging members on the lift chains;
at least one idler sprocket;
the drive chain being constrained around the idler sprocket in addition to the drive sprocket mounted on the power input shaft to define an upper chain course and a lower chain course;
one of the drive shafts having the lift chain engaging sprocket mounted thereon engaging the drive chain along the upper chain course; and
the other drive shaft having the lift chain engaging sprocket mounted thereon engaging the drive chain along the lower chain course.

25. The pan stack positioning apparatus according to claim 24 further including means for selectively varying the spacing between the pairs of spaced, parallel lift chains and the pan engaging members thereon and thereby accommodating pans of various sizes.

26. The pan stack positioning apparatus according to claim 25 wherein the positioning varying means comprises:
a pair of subframes each rotatably supporting the shafts having the lift chain engaging sprockets mounted thereon;
at least one lead screw having opposed right-hand threaded and left-hand threaded portions;
means threadedly engaging the right-hand threaded and left-hand threaded portions of the lead screw and connected to the subframe; and
means for selectively rotating the lead screw and thereby varying the positioning between the subframe and the lift chains and the pan engaging members mounted thereon.

27. The pan stack positioning apparatus according to claim 24 further including brake means for selectively preventing rotation of the power input shaft and thereby operating through the power input shaft, the drive sprocket mounted thereon, the drive chain, the drive sprockets secured to the drive shafts having the lift sprockets mounted thereon, the drive shafts and the lift sprockets mounted thereon, the lift chains and the pan engaging members to maintain a stack of pans supported on the pan engaging members in a predetermined vertical positioning.

28. The pan stack positioning apparatus according to claim 24 wherein the clutch means comprises one way clutch means so that the power input shaft is rotated responsive to rotation of the power input sprocket in one direction but is not rotated in response to rotation of the power input sprocket in the other direction.

29. The pan stack positioning apparatus according to claim 24 wherein the clutch means is selectively operable to cause rotation of the power input shaft in response to rotation of the power input sprocket in either direction and also to selectively disengage the power input sprocket from the power input shaft.

30. In a pan stacking and unstacking system, a pan transporting apparatus comprising:
means for supporting a stack of pans in a substantially vertical orientation;
a plurality of magnets mounted along a line in a horizontal plane situated directly above the stack of pans;
a pair of belts mounted for rotation in vertical planes situated on either side of the line of magnets;

each of said belts being mounted for rotation around a course including a horizontal portion extending substantially coincident with the plane of the magnets;

whereby a pan supported by the magnetic field of the magnets is transported laterally by frictional engagement with the moving belts;

said means for supporting a stack of pans comprising:
a pair of spaced apart, vertically oriented subframes;
two pairs of vertically spaced shafts each rotatably supported on one of the subframes;
each of the shafts having a pair of spaced apart lift chain sprockets mounted thereon;
two pairs of spaced, parallel lift chains constrained around the lift chain sprockets of the shafts and supported thereby for substantially vertical movement relative to the subframe;
at least one pair of opposed pan engaging members each mounted on the lift chains comprising one of the pairs for movement thereby into engagement with the lowermost pan comprising a stack of pans;
one shaft of each pair of shafts comprising a drive shaft and having a drive sprocket mounted thereon;
a power input sprocket;
at least one idler sprocket;
a drive chain constrained around the power input sprocket and the idler sprocket to define an upper chain course and a lower chain course;
the drive chain engaging the drive sprocket on one of the drive shafts along the upper chain course and engaging the drive sprocket on the other drive shaft along the lower chain course;
means for selectively rotating the power input sprocket and thereby selectively varying the vertical positioning of the pan engaging members and a stack of pans supported thereby; and
means for selectively varying the spacing between the subframes and the pairs of lift chains and the pan engaging members supported thereby and thereby accommodating pans of various sizes.

31. The pan transporting apparatus according to claim 30 wherein the stack positioning means further comprises means for maintaining a predetermined minimum spacing between the uppermost pan in the stack and the horizontal plane of the magnets.

32. The pan transporting apparatus according to claim 30 wherein each of the belts comprises a V-belt type power transmission belt.

33. The pan transporting apparatus according to claim 30 further characterized by:
means for arresting movement of a pan supported by the magnetic field of the magnets when the pan has been positioned by the belt over the stack of pans; and
means for thereafter moving the pan downwardly relative to the plane of the magnets and thereby disengaging the pan from the magnetic field of the magnets and dropping the pan onto the stack.

34. The pan transporting apparatus according to claim 30 further characterized by means for selectively moving at least certain of the magnets downwardly to engage the uppermost pan of the stack in the magnetic field of the magnets, and thereafter moving the magnets and the pan upwardly to engage the pan with the belts.

35. The pan transporting apparatus according to claim 30 wherein the means for selectively varying the spacing between the subframes and the pairs of lift chains and the pan engaging members mounted thereon comprises:
at least one lead screw having left-hand and right-hand threaded portions;
means threadedly engaging the left-hand and right-hand threaded portions and secured to the subframes; and
means for selectively rotating the lead screw and thereby varying the positioning between the subframes.

36. The pan transporting apparatus according to claim 30 wherein the power input sprocket is mounted on a power input shaft for rotation therewith and further including brake means for selectively preventing rotation of the power input shaft and thereby maintaining a predetermined vertical positioning of a stack of pans supported on the pan engaging members.

37. The pan transporting apparatus according to claim 36 wherein the shaft rotating means comprises clutch means mounted on the power input shaft, a power input sprocket mounted on the clutch means, a power input chain constrained around the power input sprocket, and fluid powered cylinder means for selectively rotating the power input sprocket by means of the power input chain.

38. The pan transporting apparatus according to claim 37 wherein the fluid powered cylinder means comprises a pneumatic cylinder having a rod connected to one end of the power input chain and further including a second pneumatic cylinder having a rod connected to the opposite end of the power input chain for applying tension thereto.

39. A pan unstacking and stacking system comprising:
opposed pairs of spaced, parallel, substantially vertically disposed lift chains, each constrained around lift sprockets mounted on spaced, parallel shafts,
at least one pair of opposed pan engaging members each mounted on the lift chains comprising one of the pairs for movement thereby into engagement with the lowermost pan comprising a vertical stack of pans;
means for selectively varying the spacing between the pairs of spaced, parallel lift chains and the pan engaging members thereon and thereby accommodating pans of various sizes;
one of the shafts which support the lift sprockets engaged with each pair of lift chains comprising a drive shaft and extending to a drive sprocket;
a drive chain constrained around the drive sprockets secured to each of the drive shafts and around a drive sprocket mounted on a power input shaft;
clutch means mounted on the power input shaft for selectively forming a driving connection thereto;
brake means for selectively preventing rotation of the power input shaft and thereby operating through the power input shaft, the drive sprocket mounted thereon, the drive chain, the drive sprockets secured to the drive shafts having the lift chain engaging sprockets mounted thereon, the drive shafts and the lift sprockets mounted thereon, the lift chains and the pan engaging members to maintain a stack of pans supported on the pan engaging members in a predetermined vertical positioning;
a power input sprocket mounted on the clutch means;
a power input chain constrained around the power input sprocket;
fluid powered cylinder means including a rod connected to the power input chain for selective actuation through the power input sprocket, the clutch means, the power input shaft, the drive sprocket mounted therein, the drive chain, the drive sprockets mounted on the drive shaft, the lift sprockets mounted on the drive shafts, and the lift chains to control the vertical positioning of a stack of pans supported by the pan engaging members on the lift chains;

a plurality of magnets mounted along a line in a horizontal plane situated directly above the stack of pans supported on the pan engaging members on the lift chains; and a pair of belts mounted for rotation in vertical planes situated on either side of the line of magnets;

each of said belts being mounted for rotation around a course including a horizontal portion extending substantially coincident with the plane of the magnets;

whereby a pan supported by the magnetic field of the magnets is transported laterally by frictional engagement with the moving belts;

one end of the power input chain being connected to the rod of the fluid powered cylinder means; and biasing means connected to the opposite end of the power input shaft for opposing the movement of the rod of the fluid powered cylinder means.

40. The pan unstacking and stacking system according to claim 39 wherein the positioning varying means comprises:

a pair of subframes each rotatably supporting the shafts having the lift sprockets mounted thereon;

at least one lead screw having opposed right-hand threaded and left-hand threaded portions;

means threadedly engaging the right-hand threaded and left-hand threaded portions of the lead screw and connected to the subframe; and means for selectively rotating the lead screw and thereby varying the positioning between the subframe and the lift chains and the pan engaging members mounted thereon.

41. The pan unstacking and stacking system according to claim 39 further including at least one idler sprocket, wherein the drive chain is constrained around the idler sprocket in addition to the drive sprocket mounted on the power input shaft to define an upper chain course and a lower chain course, wherein one of the drive shafts having the lift chain engaging sprocket mounted thereon engages the drive chain along the upper chain course, and wherein the other drive shaft having the lift chain engaging sprocket mounted thereon engages the drive chain along the lower chain course, thereby facilitating changing the spacing between the pan engaging members without changing the relative vertical positioning therebetween.

42. The pan unstacking and stacking system according to claim 39 wherein the clutch means comprises one way clutch means so that the power input shaft is rotated responsive to rotation of the power input sprocket in one direction but is not rotated in response to rotation of the power input sprocket in the other direction.

43. The pan unstacking and stacking system according to claim 39 wherein the clutch means is selectively operable to cause rotation of the power input shaft in response to rotation of the power input sprocket in either direction and also to selectively disengage the power input sprocket from the power input shaft.

44. The pan unstacking and stacking system according to claim 39 wherein both the fluid powered cylinder means and the biasing means comprise pneumatic cylinders.

45. The pan unstacking and stacking system according to claim 39 further including means for maintaining a predetermined minimum spacing between the uppermost pan in the stack and the horizontal plane of the magnets.

46. The pan unstacking and stacking system according to claim 39 further characterized by:

means for arresting movement of a pan supported by the magnetic field of the magnets when the pan has been positioned by the belts over the stack of pans; and means for thereafter moving the pan downwardly relative to the plane of the magnets and thereby disengaging the pan from the magnetic field of the magnets and dropping the pan onto the stack.

47. The pan unstacking and stacking system according to claim 39 further characterized by means for selectively lowering at least certain of the magnets until the uppermost pan of the stack is siezed by the magnetic field of the magnets and for thereafter raising the magnets and the pan to engage the pan with the belts.

48. In a pan stacking and unstacking system, apparatus for vertically positioning pan stacks comprising:

fluid powered cylinder means including a selectively extendable rod;

a power input chain connected at one end of the rod of the fluid powered cylinder means;

a power input sprocket having the power input chain constrained therearound;

a power input shaft;

clutch means for selectively coupling the power input sprocket to the power input shaft;

a drive sprocket mounted on the power input shaft;

spaced parallel drive shafts;

a pair of drive sprockets each mounted on one of the spaced, parallel drive shafts;

a drive chain constrained around the drive sprocket on the power input shaft and the drive sprockets on the spaced, parallel drive shafts;

two pairs of spaced apart lift sprockets, each pair being mounted on one of the spaced, parallel drive shafts;

opposed pairs of spaced, parallel lift chains each constrained around one of the lift sprockets; and at least one pair of opposed pan engaging members each mounted on a lift chain comprising one of the pairs for movement thereby into engagement with the lowermost pan comprising a stack of pans;

whereby the fluid powered cylinder means operates through the power input chain, the power input sprocket, the clutch means, the power input shaft, the drive sprocket mounted on the power input shaft, the drive chain, the drive sprockets mounted on the spaced, parallel shafts, the spaced, parallel shafts, the lift sprockets, and the lift chains to control the vertical positioning of the end engaging members and a stack of pans supported thereby;

at least one idler sprocket;

the drive chain being further constrained around the idler sprocket to define an upper chain course and a lower chain course;

the drive chain engaging the drive sprocket secured to one of the spaced, parallel shafts along the upper chain course; and the drive chain engaging the drive sprocket secured to the other spaced, parallel drive shaft along the lower chain course.

49. The pan stack positioning apparatus according to claim 48 further characterized by biasing means connected to the opposite end of the power input chain from the fluid powered cylinder means for maintaining tension on the power input chain.

50. The pan stack positioning apparatus according to claim 49 wherein the biasing means and the fluid powered cylinder means both comprise pneumatic cylinders.

51. The pan stack positioning apparatus according to claim 48 wherein the power input sprocket is mounted on the clutch means, and wherein the clutch means is mounted on the power input shaft.

52. The pan stack positioning apparatus according to claim 51 wherein the clutch means comprises one way clutch means so that the power input shaft is rotated responsive to rotation of the power input sprocket in one direction but is not rotated in response to rotation of the power input shaft in the opposite direction.

53. The pan stack positioning apparatus according to claim 51 wherein the clutch means is selectively operable to:
rotate the power input shaft responsive to rotation of the power input sprocket in one direction; or
rotate the power input shaft responsive to rotation of the power input sprocket in the opposite direction; or
disengage the power input shaft entirely from the power input sprocket.

54. The pan stack positioning apparatus according to claim 48 further including means for selectively preventing rotation of the power input shaft and the drive sprocket connected thereto and thereby operating through the power input shaft, the drive sprocket connected thereto, the drive chain, the drive sprockets mounted thereon and the lift chains to control the vertical positioning of the pan engaging members and a stack of pans supported thereon.

55. The pan stack positioning apparatus according to claim 48 further characterized by means for selectively varying the spacing between the opposed pairs of spaced, parallel drive chains and the pan engaging members mounted thereon.

56. The pan stack positioning apparatus according to claim 55 wherein each pair of spaced, parallel lift chains is mounted on a subframe, and wherein the spacing varying means comprises at least one lead screw having right-hand threaded and left-hand threaded portions, means threadedly engaging the right-hand threaded and left-hand threaded portions of the lead screw and secured to the subframe, and means for selectively rotating the lead screw and thereby varying the spacing between the subframes and the pairs of spaced, parallel lift chains and the pan engaging members mounted thereon.

57. In a pan stacking and unstacking system, apparatus for vertically positioning pan stacks comprising:
opposed pairs of spaced, parallel lift chains each constrained around lift sprockets mounted on spaced, parallel shafts;
at least one pair of opposed pan engaging members each mounted on the lift chains comprising one of the pairs for movement thereby into engagement with the lowermost pan comprising a stack of pans;
one of the shafts which support the lift sprockets comprising a drive shaft and extending to a drive sprocket;
a drive chain constrained around the drive sprockets secured to each of the drive shafts and around a drive sprocket mounted on a power input shaft;
clutch means mounted on the power input shaft for selectively forming a driving connection thereto;
a power input sprocket mounted on the clutch means;
a power input chain constrained around the power input sprocket;
fluid powered cylinder means including a rod connected to the power input chain for selective actuation through the power input sprocket, the clutch means, the power input shaft, the drive sprocket mounted therein, the drive chain, the drive sprockets mounted on the drive shaft, the lift sprockets mounted on the drive shafts and engaged with the lift chains, and the lift chains to control the vertical positioning of a stack of pans supported by the pan engaging members on the lift chains;
one end of the power input chain being connected to the rod of the fluid power cylinder means; and
biasing means connected to the opposite end of the power input shaft for opposing the movement of the rod of the fluid powered cylinder means.

58. The pan stack positioning apparatus according to claim 57 wherein both the fluid powered cylinder means and the biasing means comprise pneumatic cylinders.

59. The pan stack positioning apparatus according to claim 57 further including means for selectively varying the spacing between the pairs of spaced, parallel lift chains and the pan engaging members thereon and thereby accommodating pans of various sizes.

60. The pan stack positioning apparatus according to claim 59 wherein the positioning varying means comprises:
a pair of subframes each rotatably supporting the shafts having the lift chain engaging sprockets mounted thereon;
at least one lead screw having opposed right-hand threaded and left-hand threaded portions;
means threadedly engaging the right-hand threaded and left-hand threaded portions of the lead screw and connected to the subframe; and
means for selectively rotating the lead screw and thereby varying the positioning between the subframe and the lift chains and the pan engaging members mounted thereon.

61. The pan stack positioning apparatus according to claim 57 further including braking means for selectively preventing rotation of the power input shaft and thereby operating through the power input shaft, the drive sprocket mounted thereon, the drive chain, the drive sprockets secured to the drive shafts having the lift sprockets mounted thereon, the drive shafts and the lift sprockets mounted thereon, the lift chains and the pan engaging members to maintain a stack of pans supported on the pan engaging members in a predetermined vertical positioning.

62. The pan stack positioning apparatus according to claim 57 wherein the clutch means comprises one way clutch means so that the power input shaft is rotated responsive to rotation of the power input sprocket in one direction but is not rotated in response to rotation of the power input sprocket in the other direction.

63. The pan stack positioning apparatus according to claim 57 wherein the clutch means is selectively operable to cause rotation of the power input shaft in response to rotation of the power input sprocket in either direction and also to selectively disengage the power input sprocket from the power input shaft.

64. In a pan stacking and unstacking system, apparatus for vertically positioning pan stacks comprising:

opposed pairs of spaced, parallel lift chains each constrained around lift sprockets mounted on spaced, parallel shafts;

at least one pair of opposed pan engaging members each mounted on the lift chains comprising one of the pairs for movement thereby into engagement with the lowermost pan comprising a stack of pans;

one of the shafts which support the lift sprockets comprising a drive shaft and extending to a drive sprocket;

a drive chain constrained around the drive sprockets secured to each of the drive shafts and around a drive sprocket mounted on a power input shaft;

clutch means mounted on the power input shaft for selectively forming a driving connection thereto;

a power input sprocket mounted on the clutch means;

a power input chain constrained around the power input sprocket;

fluid powered cylinder means including a rod connected to the power input chain for selective actuation through the power input sprocket, the clutch means, the power input shaft, the drive sprocket mounted therein, the drive chain, the drive sprockets mounted on the drive shaft, the lift sprockets mounted on the drive shafts and engaged with the lift chains, and the lift chains to control the vertical positioning of a stack of pans supported by the pan engaging members on the lift chains;

a pair of spaced apart subframes each having one of the opposed pairs of spaced, parallel lift chains mounted thereon;

means for selectively varying the spacing between the subframes and thereby selectively varying the spacing between the opposed pairs of spaced, parallel lift chains and the pan engaging members supported thereby;

at least one idler sprocket having the drive chain constrained therearound and cooperating with the drive chain sprocket on the power input shaft to define an upper drive chain course and a lower drive chain course;

the drive sprocket of on of the drive shafts engaging the drive chain on the upper drive chain course and the drive sprocket of the other drive shaft engaging the drive chain on the lower drive chain course; and brake means for selective actuation to prevent rotation of the power input shaft.

* * * * *

UNITED STATES PATENT AND TRADEMARK OFFICE
CERTIFICATE OF CORRECTION

PATENT NO. : 4,042,124
DATED : August 16, 1977
INVENTOR(S) : William Perrin Bowdry, III and Irwin Edward Wickam It is certified that error appears in the above-identified patent and that said Letters Patent are hereby corrected as shown below:

| | |
|---|---|
| Column 6, line 23 | "shaft" should be --shafts--; |
| Column 7, line 50 | after "apparatus", delete " "'  " and insert --38'--; |
| Column 7, line 65 | "laterial" should be --lateral--; |
| Column 9, line 68 | "operates" should be --operate--; |
| Column 12, line 11 | insert --chain-- between "upper" and "course"; |
| Column 13, line 23 | "one on" should be --one of--; |
| Column 21, line 35 | insert --brake-- between "including" and "means"; |
| Column 22, line 53 | "braking" should be --brake--. |

Signed and Sealed this

Twentieth Day of December 1977

[SEAL]

Attest:

RUTH C. MASON
Attesting Officer

LUTRELLE F. PARKER
Acting Commissioner of Patents and Trademarks